TRANSMITTER - PULSE & SYNCHRONIZING SIGNAL GENERATOR

Inventor
Prafulla Kumar Chatterjea
Charles Thomas Scully
Dermot Min Ambrose
James Kinlock Berry
By Edward D. Phinney
Attorney

PULSE MODULATION COMMUNICATION SYSTEM

Filed May 21, 1945 11 Sheets-Sheet 2

Inventor
Prafulla Kumar Chatterjea
Charles Thomas Scully
Dermot Min Ambrose
James Kinloch Beney
By Edward D. Phinney
Attorney

PULSE MODULATION COMMUNICATION SYSTEM

RECEIVER - RECURRENT STEPPED WAVE PRODUCER

Inventor
PRAFULLA KUMAR CHATTERJEA
CHARLES THOMAS SCULLY
DERMOT MIN AMBROSE
JAMES KINLOCK BENEY
By Edward D O Kinney
Attorney Feb. 27, 1951 P. K. CHATTERJEA ET AL 2,542,991

PULSE MODULATION COMMUNICATION SYSTEM

Filed May 21, 1945 11 Sheets-Sheet 4

Inventor
Prafulla Kumar Chatterjea
Charles Thomas Scully
Dermot Min Ambrose
James Kinlock Beney
By [signature]
Attorney Inventor
PRAFULLA KUMAR CHATTERJEA
CHARLES THOMAS SCULLY
DERMOT MIN AMBROSE
JAMES KINLOCK BENEY
By
Edward D Phinney
Attorney Feb. 27, 1951 P. K. CHATTERJEA ET AL 2,542,991

PULSE MODULATION COMMUNICATION SYSTEM

Filed May 21, 1945 11 Sheets-Sheet 6

Inventor
PRAFULLA KUMAR CHATTERJEA
CHARLES THOMAS SCULLY
DERMOT MM AMBROSE
JAMES KINLOCK BENEY By Attorney

TRANSMITTER - CHANNEL PULSE GENERATORS.

Inventor
Prafulla Kumar Chatterjea
Charles Thomas Scully
Dermot Min Ambrose
James Kinlock Beney
By Edward D. Phinney
Attorney

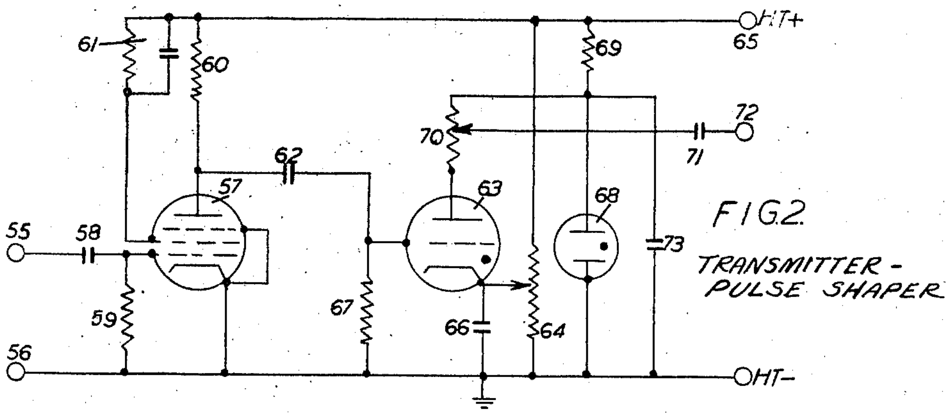
FIG. 2. TRANSMITTER - PULSE SHAPER
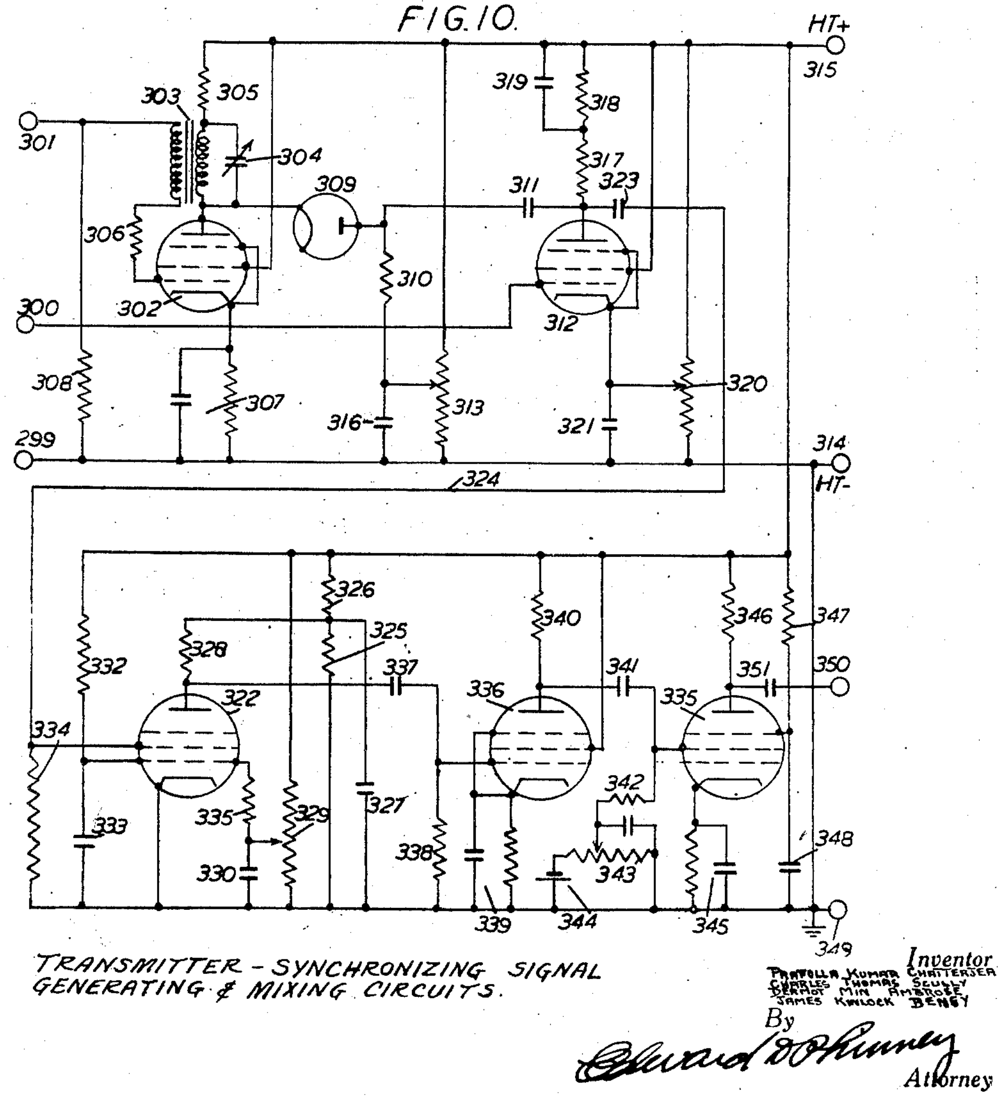
FIG. 10.
TRANSMITTER - SYNCHRONIZING SIGNAL GENERATING & MIXING CIRCUITS.
Inventor
PRAFULLA KUMAR CHATTERJEA
CHARLES THOMAS SCULLY
DERMOT MIN AMBROSE
JAMES KINLOCK BENEY
By [signature]
Attorney

PULSE MODULATION COMMUNICATION SYSTEM

Filed May 21, 1945 11 Sheets-Sheet 9

Inventor
PRAFULLA KUMAR CHATTERJEA
CHARLES THOMAS SCULLY
DERMOT MAC AMBROSE
JAMES KINLOCK BENEY
By Edward D. O'Brien
Attorney

PULSE MODULATION COMMUNICATION SYSTEM

Filed May 21, 1945 11 Sheets-Sheet 10

SYNCHRONIZING PULSE SEPARATOR

DURATION MODULATED PULSE GENERATOR

GATING PULSE GENERATOR

Inventor
PRAFULLA KUMAR CHATTERJEA
CHARLES THOMAS SCULLY
DERMOT MIN AMBROSE
JAMES KINLOCK BEWEY
By Edward D. Kinney
Attorney

PULSE MODULATION COMMUNICATION SYSTEM

Filed May 21, 1945 11 Sheets-Sheet 11

Inventor
PRAFULLA KUMAR CHATTERJEA
CHARLES THOMAS SCULLY
DERMOT MIN AMBROSE
JAMES KINLOCH BENEY
By Edward D. Phinney
Attorney Patented Feb. 27, 1951 2,542,991

UNITED STATES PATENT OFFICE 2,542,991

PULSE MODULATION COMMUNICATION SYSTEM

Prafulla Kumar Chatterjea, Charles Thomas Scully, Dermot Min Ambrose, and James Kinloch Beney, Aldwych, London, England, assignors, by mesne assignments, to International Standard Electric Corporation, New York, N. Y., a corporation of Delaware Application May 21, 1945, Serial No. 594,870
In Great Britain March 1, 1945

5 Claims. (Cl. 179—15)

The present invention relates to an electric communication system employing time-phase modulated trains of electric pulses.

By a time-phase modulated train of pulses is meant a train in which the time interval between successive pulses is varied in accordance with a modulating signal. Time-phase modulation is the same type of modulation as that known in some quarters as "angular velocity modulation."

The principal object of the invention is to provide means for synchronising the transmitting and receiving apparatus of the system which is not subject to false operation due to accidental combination of the channel pulses, or to fading, interference, or other disturbing causes, and which at the same time results in relatively simple circuits not requiring the use of large numbers of valves.

In multichannel pulse transmission systems it is usual to transmit a separate train of pulses for each channel, corresponding single pulses of the several channels being transmitted at different times in each synchronised period. Each of the trains of pulses is time-phase modulated by the signals which are to be conveyed by that train. In order that the receiver may be able to respond at the right times to the respective trains of channel pulses, regularly repeated synchronising signals are transmitted to the receiver to define the synchronised periods. It is evidently necessary that the synchronising signals should be easily distinguishable from the channel pulses, and in previous arrangements, the synchronising signals have commonly comprised pulses differing in form or amplitude or both from the channel pulses. The transmitting, receiving and separating out of such special synchronising pulses usually entails the use of different combinations of circuits resulting in complicated arrangements and it will be evident that considerable simplification will result if all pulses employed in the system are of the same form and amplitude.

It is to be noted that a synchronising signal has been previously proposed consisting of two closely spaced pulses of similar form to the channel pulses. Such a synchronising signal is not satisfactory, since unless a rigid and sometimes undesirable limitation of the depth of modulation is imposed, it is possible for two adjacent channel pulses to approach sufficiently closely together to produce a false synchronising signal which the receiver cannot distinguish from the proper signal. Further it is possible that even when the depth of modulation is limited in this way, an interfering pulse may combine with one of the channel pulses to form a signal which could not be distinguished at the receiver from the proper synchronising signal.

According to the present invention, therefore, the synchronising signals comprise close groups of more than two pulses identical in form and amplitude with the channel pulses. In particular, a synchronising signal comprising a close group of three such pulses is quite satisfactory, although a group of four or more could be used if desired.

A further advantage of the use of a multiple pulse synchronising signal is that the risk of false operation by interfering signals is practically eliminated, since the chance of such interfering signals closely imitating the special synchronising signal whether by combination with channel pulses, or not, is so remote as to be negligible.

Two types of transmitting apparatus and two types of receiving apparatus will be described to illustrate the invention. The most obvious difference between these respective types is that gas filled or "soft" valves are used in the pulse generating circuits in the transmitter, and in the receiving circuits in one type, while only hard valves are used in the other type. There are other more important differences which will be made clear in the description, but either type of transmitting apparatus may be used with either type of receiving apparatus. The device of hard or soft valves for use in these circuits is merely a matter of convenience, and it will be evident that advantage may be taken of the special more important features of those types of circuit while using hard or soft valves in either.

The invention will be explained with reference to the accompanying drawings, in which:

Figs. 1 and 2 together show a schematic circuit diagram of a transmitting arrangement according to the invention;

Fig. 3 shows diagrams used to explain the action of the transmitting arrangement;

Figs. 4 and 5 together show schematic circuit diagrams of a receiving arrangement according to the invention;

Figs. 6, 7 and 8 show diagrams used to explain the action of the receiving arrangement;

Figs. 9 and 10 together show a schematic circuit diagram of an alternative transmitting arrangement;

Figure 1:
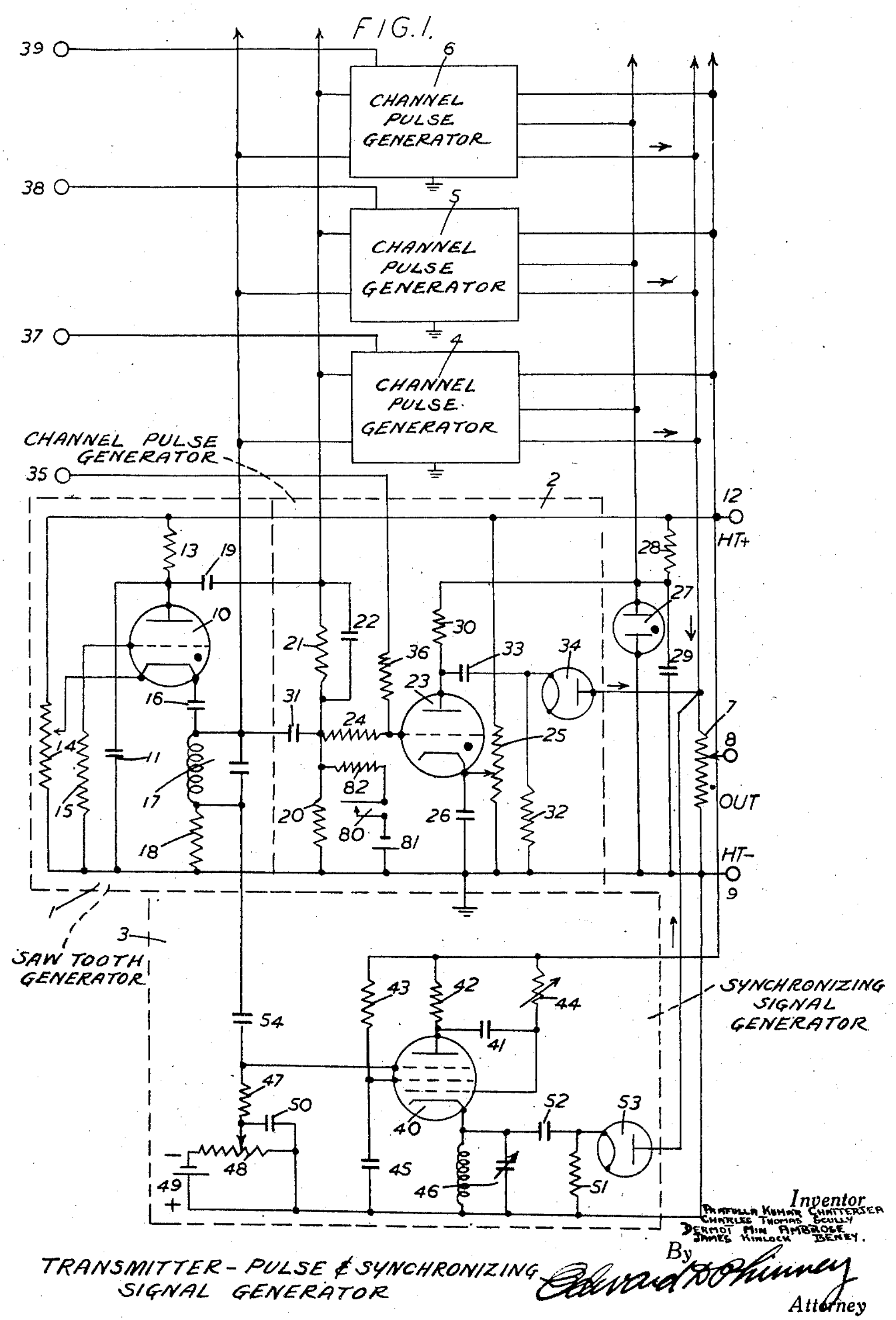
Fig. 1 shows the circuit of one arrangement for generating the channel pulses, and also the special synchronising signals, for the system according to the invention. The circuit comprises a saw-tooth wave generator, a channel pulse generator, and a synchronising signal generator, enclosed respectively in the dotted outlines 1, 2 and 3.

The outline 2 covers the apparatus for generating a train of pulses corresponding to one of the channels of the multi-channel system. The channel pulse generator is duplicated for each of the channels of the system. Additional channel pulse generators are represented by the blocks 4, 5 and 6, but it will be understood that there may be any number of these pulse generators. They may be all identical with the generator 2, except for the adjustment of one of the elements, as will be explained later. The channel pulses and the synchronising signals are all mixed together in the common load resistance 7 having an adjustable contact connected to an output terminal 8.

This terminal 8 and the corresponding ground terminal 9 are intended to be connected to the input terminals of the circuit of Fig. 2, which is for the purpose of amplifying and shaping the pulses so that they are all exactly alike and of substantially rectangular form. This circuit will be described in detail later.

The generators 1 and 2 in Fig. 1 operate in substantially the same way as the corresponding generators of Fig. 1 accompanying the specification of U. S. Patent No. 2,462,071 of P. K. Chatterjea et al. issued Feb. 22, 1949 for "Double Thyratron Pulse Generator," and differ only in minor details which are concerned with the particular requirements of the present invention.

The saw-tooth wave generator 1 comprises a gas filled triode valve 10 connected to discharge periodically a condenser 11 which is charged from the high tension source (connected at terminal 12) through a resistance 13. This will be recognised as a well known arrangement. The cathode of the valve 10 is suitably biassed positively by connecting it to the movable tap of a potentiometer 14 connected across the high tension supply. The control grid of the valve 10 is connected to earth through the usual leak resistance 15.

The cathode is also connected to earth through a chain of impedances comprising a large blocking condenser 16, a parallel resonant circuit 17 and a resistance 18.

The saw-tooth waves generated at the anode of the valve 10 are supplied through a blocking condenser 19 to all the channel pulse generators 2, 4, 5, 6 etc. in parallel. Referring to the generator 2, the saw-tooth waves are applied to a reducing potentiometer consisting of the two resistances 20 and 21 connected in series between the condenser 19 and ground, the resistance 21 being shunted by a condenser 22. The junction point of the resistances is connected to the control grid of a gas-filled triode valve 23 through a resistance 24. The cathode of this valve is positively biassed from a potentiometer 25 connected across the high tension supply, the usual by-pass condenser 26 being provided.

An anode current source of stabilised voltage for this valve is provided by the arrangement of the neon tube 27 and resistance 28 connected in series across the high tension supply. The neon tube 27 is shunted by a smoothing condenser 29. The anode of the valve 23 is connected to the junction point of the elements 27 and 28 through a resistance 30. It will be seen that the operating voltage for the valve 23 is held substantially constant by the neon tube in spite of variations of the voltage of the supply. This arrangement is explained in the specification previously referred to. It will be seen that the operating voltage for all the channel pulse generators is stabilised by the neon tube 27, but if desired, a separate stabilising circuit including a neon tube could be provided for each of the pulse generators.

The saw-tooth valve voltage applied to the control grid of the valve 23 increases positively during the charging period of the condenser 11, and a point is reached, according to the bias of the cathode, when the valve 23 fires. The valve is extinguished again on the occurrence of each fly-back stroke of the saw-tooth wave. Thus rectangular pulses of voltage are obtained at the anode of the valve 23, of which the trailing edges coincide with the fly-back strokes of the saw-tooth waves, and the leading edges occur at times depending on the adjustment of the cathode bias as determined by the setting of the potentiometer 25. As the positive bias is increased, so the leading edges of the pulses occur later. This is all made clear in the specification referred to above, which also explains the action of the parallel resonant circuit 17, which is coupled to the control grid of the valve 23 through the blocking condenser 31 and resistance 24. The circuit 17 is tuned to a high frequency, and is excited by the fly-back strokes of the saw-tooth wave and superposes thereon a very short damped train of oscillations which ensures the extinction and/or firing of the valve 23 for extreme adjustments of the cathode bias.

The resistances 20 and 21 form a reducing potentiometer whereby only a fraction of the saw-tooth voltage generated by the valve 10 is applied to the valve 23. It will be noted that all the channel pulse generators are connected together at the junction point of the resistance 21 and the condenser 19, and there is thus some risk of the introduction of cross talk between the channels. If the reducing ratio of the potentiometer 20, 21 is 1/20, for example the cross-talk reduction from channel to channel will be at least 25 decibels.

The condenser 22 is provided to compensate for the high frequency distortion produced by unavoidable stray capacity shunting the resistance 20.

The rectangular pulses at the anode of valve 23 will be of negative polarity and are applied to a differentiating circuit consisting of the resistance 32 and condenser 33, so that very short negative pulses of voltage are obtained across the resistance 32 corresponding with the movable leading edges of the rectangular pulses, and short positive pulses coinciding with the fixed trailing edges. The junction point of the elements 32 and 33 is connected to the load resistance 7 through a diode 34 (or other suitable rectifier) directed so that it suppresses the short positive pulses. Thus only the short negative pulses are obtained in the load resistance 7, and these pulses are the channel pulses and are adjustable in time with respect to the fixed fly-back strokes of the saw-tooth wave. They may be set at any desired points in the synchronised periods by adjusting the potentiometer 25.

The channel pulses are modulated by applying a signal voltage from an appropriate circuit (not shown) at the terminal 35 which is connected to the control grid of the valve 23 through a resistance 36. The mean position of the channel pulses having been determined by the setting of the potentiometer 25, then these pulses will be time-phase modulated by the signal.

Modulating signals for the other channels are likewise applied respectively to terminals 37, 38, 39 etc., corresponding to the channel pulse generators 4, 5, 6 etc., and the corresponding modulated channel pulses are applied in multiple to the common load resistance 7 as indicated. The modulating signals may be of any type generated in circuits not shown.

It will be understood that the only difference between the channel pulse generators 2, 4, 5, 6, etc., is in the adjustment of the resistance 25 which determines at what point in the synchronised period the corresponding channel pulse is transmitted. This will be explained in more detail later on.

The synchronising signal generator 3 comprises a hard pentode valve 40 having the control grid connected to the anode by a condenser 41. The anode, screen grid and control grid are connected to the high tension supply through resistances 42, 43, and 44, respectively, the latter being adjustable. The screen grid is connected to earth by a condenser 45. The cathode is connected to earth through a parallel resonant circuit 46 comprising an inductance and a condenser, either or both of which may be adjustable for tuning. The suppressor grid is connected through a high resistance 47 to an adjustable negatively biassing arrangement comprising a potentiometer 48 connected to a suitable source 49 of negative potential. This source is conventionally represented as a battery and may be provided in any convenient way: but it should be efficiently smoothed if derived from an alternating current source. The by-pass condenser is shown at 50.

The resonant circuit 46 is connected to a load resistance 51 through a blocking condenser 52, and through a diode 53 to the common load resistance 7.

The junction point of the resistance 18 and the resonant circuit 17 in the generator 1 is connected through a condenser 54 to the suppressor grid of the valve 40. Thus on the occurrence of each fly-back stroke a very short positive pulse is applied to this grid. The bias should be adjusted by means of the potentiometer 48 to a negative value sufficiently large to cut off the anode current of the valve 40 in the absence of any pulses applied through the condenser 54. A current will, however, flow between the control grid and the cathode, since the former is polarised positively through the resistance 44.

The resistance 42 should be rather larger than is customary for an anode resistance; of the order of 1 megohm, for example. The resistance 43 should be a small fraction of the resistance 42, and 44 should be of the same order as 42. Thus when the suppressor grid is biased in such manner as to cut off the anode current completely, the cathode current will be made up of a relatively large portion coming from the screen grid and a much smaller portion coming from the control grid.

When the exciting pulse arrives at the suppressor grid, anode current is suddenly established causing a fall in the anode potential, on account of the potential drop in the anode resistance 42. A negative change is at the same time supplied to the condenser 41, from the anode. The fall of potential of the anode is also communicated to the control grid which then cuts off the valve. The exciting pulse disappears almost immediately, but the anode voltage cannot return to its original value on account of the charge on the condenser 41 which leaks away slowly through the resistance 42. The sudden change in the cathode current resulting from the establishment of the anode current on the arrival of the pulse excites the resonant circuit 46 which proceeds to oscillate, being slightly damped by the load connected thereto in series with the blocking condenser 52. However, when the charge on the condenser has leaked away sufficiently to permit the control grid voltage to rise above the cut off value, cathode current is established in the valve and damps the resonant circuit after it has executed a few complete oscillations. The rate of discharge of the condenser 41 depends on the adjustment of the resistance 44 which can be set so that only a desired number of oscillations takes place.

This simplified explanation of the action of the circuit is believed to be substantially correct, but the processes which go on are more complicated than this and are not very clearly understood. The above explanation has been confirmed in its main outlines by actual oscillograph tests in a particular case.

The resonant circuit 46 should be tuned to the repetition frequency desired for the pulses which are to form the group comprising the synchronising signal. The resistance 44 is adjusted so that the valve remains in the conducting condition just long enough for the resonant circuit to execute three complete oscillations (or other higher number according to the number of pulses desired for the group). These oscillations are applied through the large blocking condenser 52 and diode 53 (or other rectifier) to the load resistance 7, as already stated. The diode is directed so that it cuts off the positive loops of the oscillations and passes only part of the negative loops. The resistance 51 biasses the cathode of the diode slightly positively so that only the tip portions of the negative loops are passed by the diode.

It will thus be seen that the signals appearing in the load resistance 7 comprise periodically repeated close groups of three (or more) negative pulses forming the synchronising signals, with one negative pulse for each channel occurring in the interval between each pair of synchronising signals.

In order to ensure that all the pulses ultimately transmitted are of identical rectangular form, the pulses generated by the circuit of Fig. 1 are applied to the circuit of Fig. 2, the input terminals 55 and 56 of which are intended to be respectively connected to the output terminals 8 and 9 of Fig. 1.

Referring to Fig. 2, the pentode valve 57 is arranged in a conventional manner as an amplifier, and is inserted for the purpose of amplifying and inverting the pulses which are applied to its control grid through a blocking condenser 58. A grid leak resistance 59, anode current supply resistance 60, screen grid polarising circuit 61 are associated with the valve 57 in the usual way.

The amplified and inverted pulses are applied from the anode of the valve 57 through a blocking condenser 62 to the control grid of a gas filled triode valve 63. The cathode is biassed positively from a potentiometer resistance 64 connected across the high tension supply, the positive terminal of which is 65. The cathode by-pass condenser is 66, and 67 is the usual grid leak resistance.

A stabilised operating anode voltage for the valve 63 is provided by the neon tube 68 and resistance 69, arranged in the same way as the elements 27 and 28 in Fig. 1. The anode is connected to the junction point of the elements 68 and 69 through a potentiometer resistance 70, the adjustable contact of which is connected through a blocking condenser 71 to the output terminal 72. A smoothing condenser 73 is connected across the neon tube 68.

The bias of the cathode of the valve 63 should be adjusted so that in the absence of any voltage applied to the control grid, the valve is extinguished. The positive pulses applied through the condenser 62 should be of large amplitude so that each leading edge carries the control grid very rapidly to a positive potential sufficient to fire the valve 63. The corresponding trailing edge then rapidly extinguishes the valve, so that accurate rectangular pulses, having uniform amplitudes determined by the setting of the potentiometer 70, will be obtained at the output terminal 72.

In order to make clearer the action of the circuits of Figs. 1 and 2, a specific example of a four channel system according to the invention will be explained. It will be assumed that the synchronised period is 100 microseconds long and that the pulses are all 0.5 microsecond wide. The synchronising signal will consist of three such pulses, having their centres spaced apart by 2 mircroseconds, so that the total width of the synchronsising signal is about 5½ microseconds. There are to be four channel pulses in each period which when unmodulated should be equally spaced between the corresponding synchronising signals.

Figure 3:
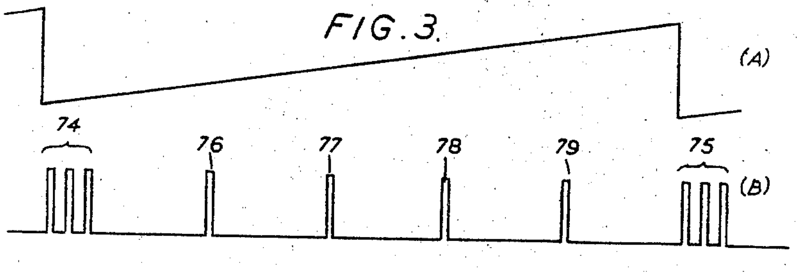

The elements 11 and 13 of Fig. 1 should be adjusted so that a saw-tooth wave at a frequency of 10 kilocycles per second (kcs.) is generated. Fig. 3 (A) shows one period of the time variation of the voltage at the anode of the valve 10. Fig. 3 (B) shows the correponding pulses of voltage obtained at the output terminal 72 of Fig. 2. Two consecutive synchronising signals are shown at 74 and 75 in Fig. 3 (B), and the leading edge of the first of the three pulses in such case will occur very slightly later than the corresponding fly-back stroke of the saw-tooth wave in Fig. 3 (A).

In order to generate the synchronising signals the resonant circuit 46 of Fig. 1 should be tuned to 500 kcs. giving a period of 2 microseconds as desired, and the biassing of the diode 53 should be adjusted to the negative loops at a level where they are about ½ microsecond wide.

In order to obtain this result in a particular case, the elements of the generator 3 had the following values:

Resistance 42, 1 megohm.
Resistance 43, 10,000 ohms.
Resistance 44, variable 1 to 1.15 megohms.
Resistance 47, 10,000 ohms.
Resistance 51, 100,000 ohms.
Condenser 41, 50 micro-microfarads.
Condenser 45, 400 micro-microfarads.
Valve 40, Pentode VR116.

The values for this circuit could have been chosen to produce more than three oscillations at some other frequency than 500 kcs., but it is to be noted that the time constant of the elements 42 and 44 should be less than the period of the resonant circuit 46.

Four channel pulse generators 2, 4, 5 and 6 will be required, and the potentiometers 25 should be individually adjusted so that the four channel pulses 76, 77, 78, 79 Fig. 3 (B) when unmodulated, are equally spaced in the interval between the two synchronising signals 74 and 75. Under these conditions the interval between any two adjacent channel pulses, or between the first and last channel pulse and the adjacent synchronising signal will be about 18½ microseconds, and this will allow a maximum excursion for each modulated pulse of nearly ±9 microseconds about the mean position shown in Fig. 3 (B).

The differentiating circuits 32, 33 in the channel pulse generators should be adjusted so that the resulting output channel pulses are all 0.5 microsecond wide.

Referring again to Fig. 2, the output pulses at terminal 72 may be applied to the radio or other transmitting equipment (not shown), which may be of any desired form.

When the communication channels carried by the pulses are ordinary speech channels it is usually necessary to provide calling or ringing means. This may of course be done by providing the usual ringing circuits in the low-frequency equipment and modulating the pulses with the ringing currents. This does not call for any special arrangements. In some cases, however, for example in communication circuits for aircraft, such ringing equipment is not available, and some simple calling means is required. A convenient method of calling is provided by suppressing altogether for a few seconds the pulses corresponding to the channel concerned. Provision for this is made in Fig. 1 by the contacts 80 in the channel pulse generator 2, which may be controlled by a suitable key or relay (not shown), and which when closed connect a source 81 of relatively large negative biassing potential through a resistance 82 and through the previously mentioned resistance 24 to the control grid of the gas-filled triode 23. The potential of the source 81 should be sufficiently great to prevent the saw-tooth waves derived from the valve 10 from firing the valve 23. Thus when the contacts 80 are closed the corresponding channel pulses are suppressed, and appropriate means is provided in the receiver (which will be presently explained) for detecting the absence of the pulses and giving a suitable signal. The pulse generators 4, 5, 6 etc., may all be equipped with the elements 80, 81 and 82 in exactly the same way. If desired, of course, the source 81 could be common to all the pulse generators.

Figure 4:
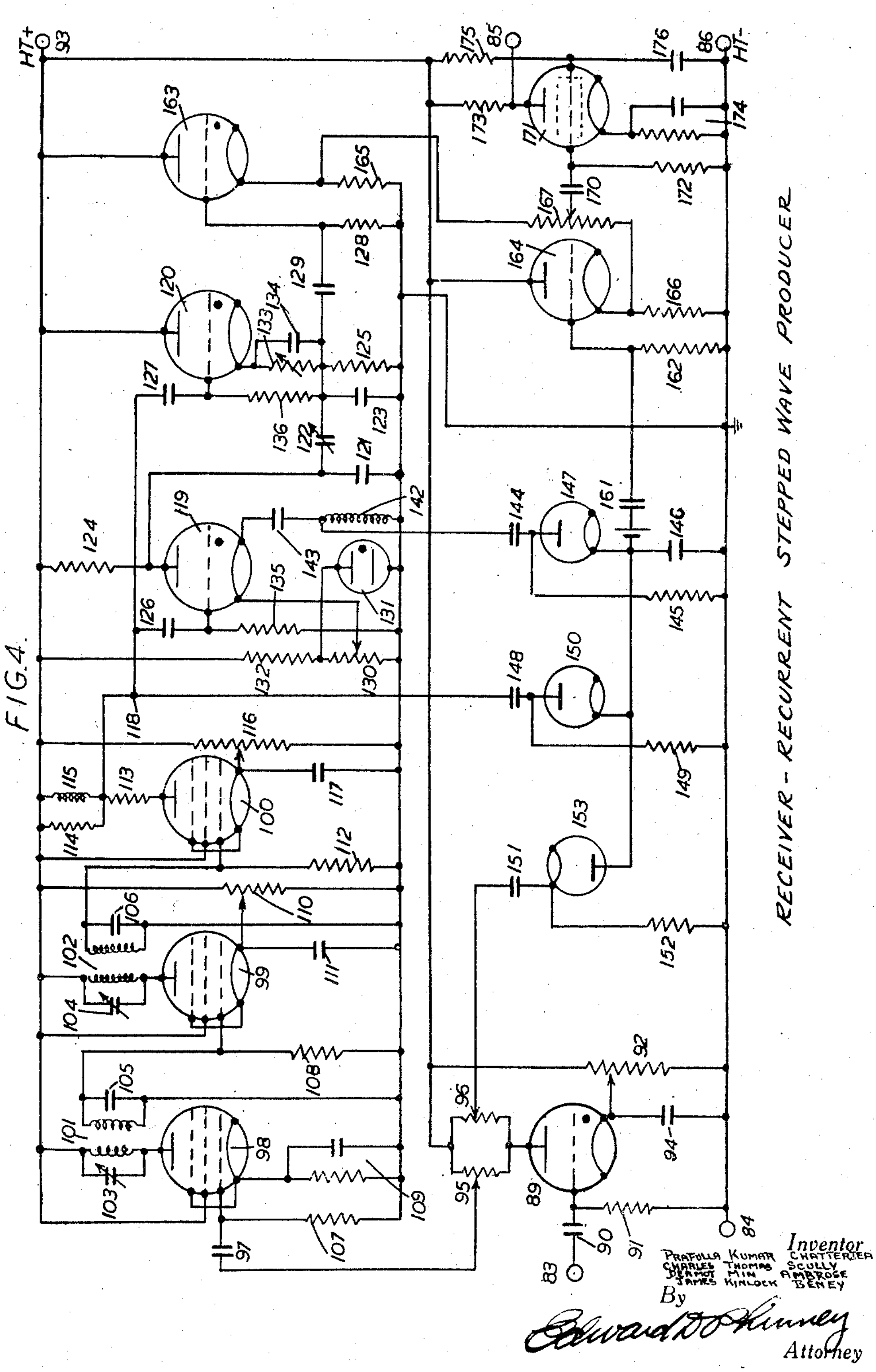
Figure 5:
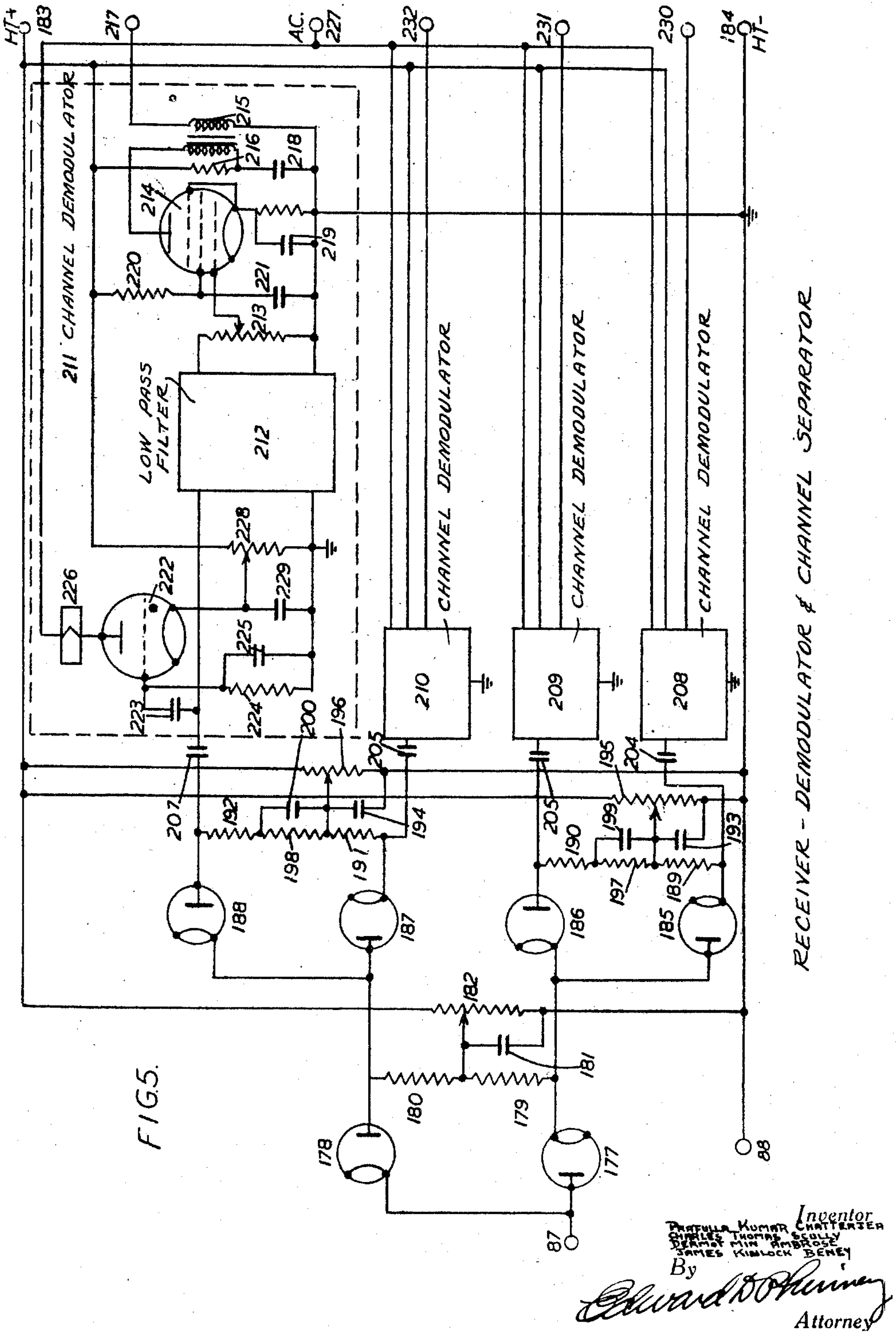

The circuits of a receiver suitable for receiving the type of channel signals shown in Fig. 3 (B) are given in Figs. 4 and 5. It is assumed, of course, that any necessary demodulation of radio waves or the like has already been performed in appropriate apparatus (not shown). The pulses of Fig. 3 (B) are applied at the input terminals 83 and 84 of Fig. 4. As will be fully explained, this circuit produces a recurrent stepped wave at the output terminals 85 and 86 such that the leading edges of the steps correspond with the modulated channel pulses 76 to 79 of Fig. 3. The circuit of Fig. 5, whose input terminals 87 and 88 are intended to be connected respectively to 85 and 86, then derives four separate trains of duration modulated pulses from the stepped wave by a process of amplitude selection, and these trains are demodulated by filtering, the recovered signals being then amplified in four separate low frequency amplifiers.

Referring first of all to Fig. 4, the pulses applied at terminals 83 and 84 should be of positive polarity and will probably be more or less distorted as a result of transmission over the communication medium. They are accordingly first cleaned up by means of gas-filled valve 89, to the control grid of which they are applied through a blocking condenser 90. The usual grid leak resistance 91 is provided, and the cathode is biassed from a potentiometer 92 connected across the high tension supply whose positive terminal is 93. The cathode by-pass condenser is 94. The anode comprises two potentiometers 95 and 96 connected in parallel. The cleaned up channel pulses and synchronising signals are obtained from these potentiometers. All such pulses will be of negative polarity.

The pulses obtained from potentiometer 95 are applied through a blocking condenser 97 to a series of three hard pentode valves 98, 99 and 100 connected in tandem, which derive from the three close pulses forming the synchronising signal a single synchronising pulse. The anode loads of the valves 98 and 99 comprise respectively the transformers 101 and 102 whose primary windings are tuned by the condensers 103 and 104, which may be adjustable as shown, and whose secondary windings are tuned by the condensers 105 and 106. The grid leak resistances are 107 and 108 respectively.

The valve 98 is appropriately biassed by a condenser resistance network 109 connected in series with the cathode, and the valve 99 is adjustably biassed by connecting the cathode to the movable contact of a potentiometer 110 connected across the high tension source, the corresponding by-pass condenser being 111. The secondary winding of the transformer 101 is connected across the resistance 108, and that of the transformer 102 is connected across the grid leak resistance 112 of the valve 100. This valve has an anode load impedance consisting of the resistances 113 and 114 connected in series and the inductance 115 shunting the resistance 114. The cathode of this valve is biassed from a potentiometer 116 connected across the high tension supply, 117 being the by-pass condenser.

The transformers 101 and 102 should be tuned to the repetition frequency of the three pulses forming the synchronising signal, and the damping, which is controlled principally by the value of the resistances 108 and 112 respectively should be adjusted so that when excited by a single pulse applied to the control grid of the corresponding valve, the oscillations have practically died out after about one and a half complete oscillations. When the first of the group of three synchronising pulses excites the transformer 101, an oscillation similar to that shown in Fig. 6 at (C) is obtained. The second pulse produces a similar oscillation as shown at (D) in Fig. 6, one complete period later. The third pulse produces a third oscillation as shown at (F) in Fig. 6. When (C) and (D) are added together, the resultant shown at (E) has a central loop which is higher than either of the adjacent loops, due to the combination of the first half oscillation of (D) with the third half oscillation of (C). Likewise when (E) and (F) are added together, the resultant shown at (G) in Fig. 6 has two approximately equal central loops which are higher than the adjacent loops on either side. The first of these is equal to the central loop of (E), and the second is produced by the combination of the first half oscillation of (F) with the fifth half oscillation of (E). The transformer 101 is so poled that the two central loops of the oscillations (G) are applied positively to the control grid of the valve 99, and the cathode bias is adjusted by means of the potentiometer 110 so that the valve is cut off below the level corresponding to the dotted line in Fig. 6 (G). Then only the two high central loops can unblock the valve, producing two pulses in its anode circuit.

Figure 6:
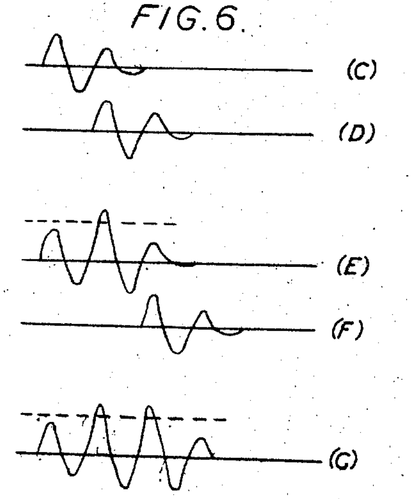

These two pulses excite the transformer 102 and produce two superposed oscillations like (C) and (D) shown in Fig. 6, the resultant being shown at (E), having one central loop higher than the two adjacent loops on either side, except that it will be one period later. If the cathode bias of the valve 100 is adjusted by means of the potentiometer 110 so that the valve is cut off below the level corresponding to the dotted line in Fig. 6 (E) it can be unblocked only by the single central loop, the transformer 102 being poled so that this loop is positive when applied to the control grid of the valve. Thus a single pulse of anode current is produced in this valve. It will be noted that the single pulse produced in the valve 100 will be slightly later than the third of the three original pulses which form the synchronising signal.

It will be understood that any single channel pulse cannot produce any pulse in the valve 100 because by itself its amplitude will be insufficient to unblock the valve 99, while two channel pulses coming close together would produce only a single pulse in the valve 99 which by itself could not unblock the valve 100. Thus only the proper synchronising signal consisting of three closely spaced pulses can produce any effect.

It will be obvious that should it be desired to use a synchronising signal consisting of a close group of more than three equally spaced pulses, then one or more extra valves (not shown) arranged exactly like the valve 99 would be interposed between the valves 99 and 100 in Fig. 4.

The inductance 115 is included in the anode circuit of the valve 100 in order to act as an inverter, since the single output synchronising pulses obtained from the valve are required to be positive. Any other suitable inverting means could be used instead.

Thus at the point 118 in Fig. 4 there is obtained a series of single synchronising pulses of positive polarity, each timed slightly later than the third of the corresponding group of pulses forming the original synchronising signal.

The two gas-filled valves 119 and 120 are associated with a double relaxation oscillator circuit for the purpose of generating a periodic wave of stepped form synchronised by the pulses at the point 118, and having four rectangular steps in each period. The group of three condensers 121, 122 and 123 is shared by both the valves and forms with the resistance 124 in series with the anode of valve 119 a saw-tooth oscillation circuit which should be adjusted to oscillate uncontrolled at about 43 kcs. in the case of the particular example given above. This is the usual type of circuit, and saw-tooth waves of positive polarity will be obtained across the condenser 123. This group of condensers also forms a relaxation oscillator circuit with the resistance 125 connected in series with the cathode of the valve 120. This circuit should be adjusted to oscillate at 10 kcs., and saw-tooth waves of negative polarity are then obtained across the condenser 123 by the discharge of the condenser group through the resistance 125. These two oscillators are synchronised by the pulses at the point 118 applied through the blocking condensers 126 and 127 to the respective control grids. The two combined saw-tooth waves are applied to the load resistance 128 through the blocking condenser 129. The condenser 122 may be made adjustable for the purpose of correcting slight frequency drifts.

Stabilised adjustable cathode bias for the valve 119 is provided by the potentiometer 130 shunted by the neon tube 131, connected in series with the resistance 132 across the high tension supply. Cathode bias for the valve 120 is provided by the adjustable resistance 133 shunted by the condenser 134. Grid leak resistances for the valves 119 and 120 are designated 135 and 136 respectively.

Figure 7:
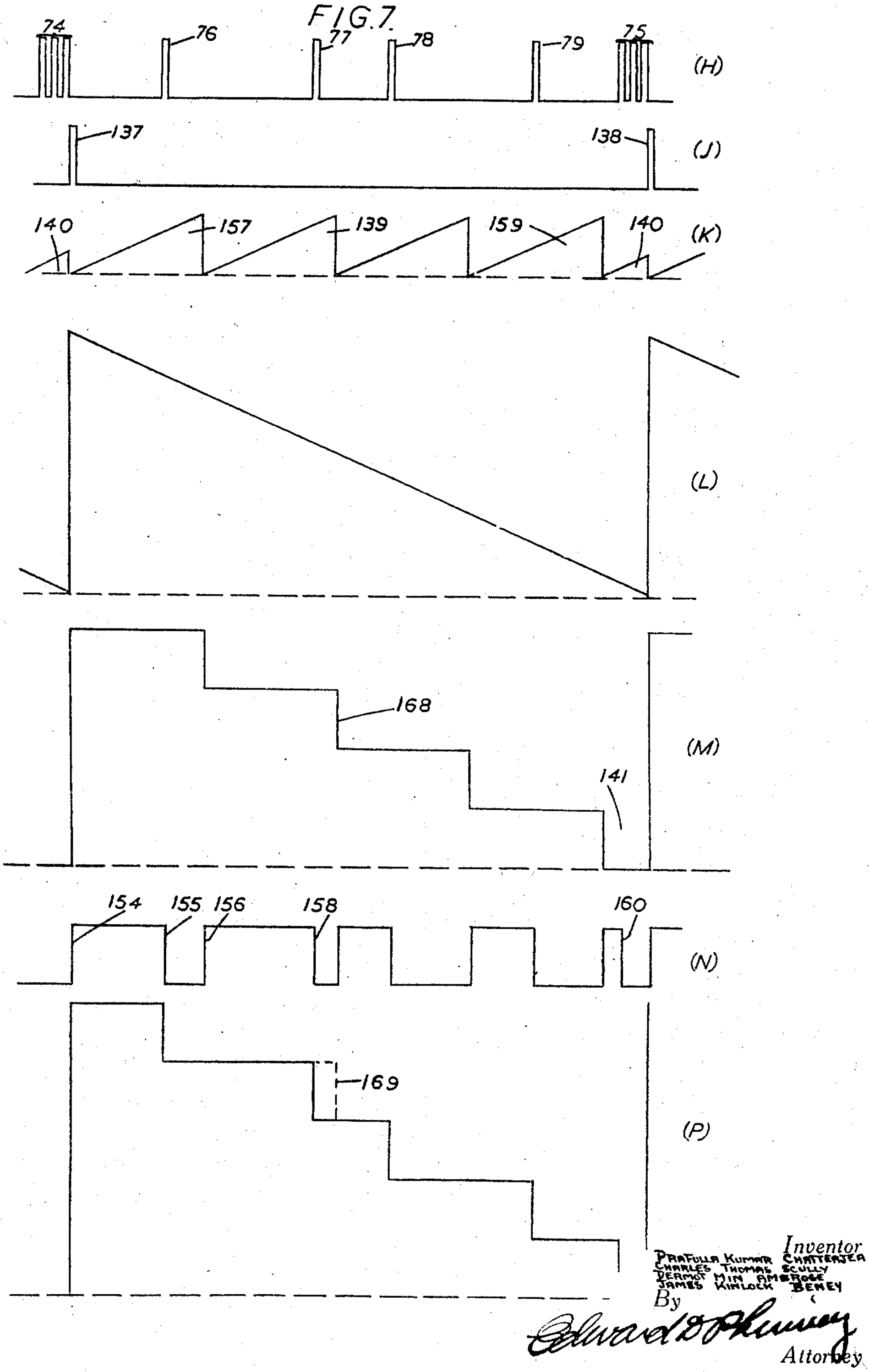

The action of the circuits described so far will be understood by reference to Fig. 7. In this figure (H) shows one synchronised period including the synchronising signals 74 and 75, and the four channel pulses 76, 77, 78 and 79 arranged as shown in Fig. 3 (B), except that the channel pulses are supposed to be modulated, and have been shifted by various arbitrary amounts from the mean positions shown in Fig. 3 (B). These pulses are all applied at the input terminals 83 and 84 of Fig. 4, and as already explained single synchronising pulses 137 and 138 shown in Fig. 7 (J) appear at the point 118. In Fig. 7, (K) and (L) show respectively the saw-tooth waves generated by the valves 119 and 120, the first being of positive polarity and the second, negative. These waves are synchronised by the pulses 137 and 138, which will be 100 microseconds apart, so that the wave (L) will have a frequency of exactly 10 kc. The wave (K) will execute four complete oscillations 139 having a period of about 23 microseconds and a fifth oscillation 140 cut short by the synchronising pulse.

The amplitudes of the saw-tooth waves (K) and (L) should be so chosen that the sloping portions of the waves make approximately the same angle with the time axis. Under these conditions, the combination of the two waves which appears in the load resistance 128 will be a stepped wave as shown in Fig. 7 (M), the vertical edges of the steps corresponding to the flyback strokes of the wave (K). The horizontal portions of the four steps are of length equal to the free period of the wave (K), and there is a short interval 141 after the last step corresponding to the short oscillation 140.

Referring again to Fig. 4, it will be seen that there is an inductance 142 connected in series with the cathode by-pass condenser 143 for the valve 119. The junction point of these two elements is connected through a blocking condenser 144 to a load resistance 145, so that on the occurrence of each fly-back stroke of the wave (K), Fig. 7, a very short pulse is applied to the resistance 145. This pulse is arranged to charge a condenser 146 through a diode 147 directed so that the condenser receives a positive charge. Since the amplitude of the last fly-back stroke which cuts short the wave 140 is small, the synchronising pulse 137 is applied from the point 118 through a blocking condenser 148 to a load resistance 149 and provides an auxiliary positive charge for the condenser through the diode 150.

The signal pulses shown in Fig. 7 (H) are applied from the potentiometer 96 through a blocking condenser 151 to a load resistance 152, and are of negative polarity. They are arranged to discharge the condenser 146 through the diode 153 (which is directed oppositely to the other two diodes), shortly after it has been charged in the manner already explained. The potential variation of the condenser 146 is shown at (N) in Fig. 7. The condenser is charged at 154 by the synchronising pulse 137 but is discharged again at 155 by the pulse 76 which arrives soon after. It will be charged again at 156 by the fly-back stroke 157, and discharged at 158 by the pulse 77, and so on. The final discharge of the condenser after the last flyback stroke 159 occurs at 160, and is produced by the first of the three pulses forming the group 75, and the condenser is ready to be charged again at the commencement of the next period by the pulse 138.

It will be noted that the leading edges 154, 156 etc. of the rectangular positive pulses so produced are fixed in time, and coincide with the vertical edges of the steps of the wave (M), but the trailing edges 155, 158 etc. move with the corresponding pulses 76, 77 etc. The rectangular pulses (N) are applied through a blocking condenser 161 (Fig. 4) to a load resistance 162.

It will be remembered that the wave (M) is applied to the load resistance 128. The two load resistances 128 and 162 are connected respectively to the control grids of two similar amplifying valves 163 and 164 arranged as cathode followers, the corresponding cathode load resistances being 165 and 166. The two cathodes are connected through a mixing potentiometer 167 in which the amplified waves (M) and (N) of Fig. 7 are added together. The amplitudes should be so adjusted that the depths of the steps of the wave (M) are equal to the heights of the rectangular pulses of the wave (N). The resulting combined wave is shown at (P) in Fig. 7. This is a stepped wave in which the steps of the wave (M) have disappeared because they are neutralised by the corresponding equal and opposite leading edges of the pulses (N) which occur at the same times. The new steps are produced by the trailing edges of the pulses (N) and, therefore, coincide with the pulses 76 to 79 and move with them. The vertical edges of the steps of the wave (P) are therefore time-phase modulated in the same way as the corresponding channel pulses.

It is to be noted that by this arrangement, the disappearance of one or more pulses of one of the channels does not cause the disappearance of the corresponding step of the wave (P). This can be easily understood as follows. Suppose that the pulse 77 is suppressed. Then the trailing edge 158 and the next leading edge of the pulses (N) both disappear, but since the edge 168 of the corresponding step of the wave (M) is now not neutralised, it will appear in the wave (P) as shown dotted at 169. Thus when a channel pulse disappears, it is represented in the wave (P) by a fixed edge which coincides with the next following fly-back stroke of the wave (K).

The wave (P) which appears in the load resistance 167 is applied through a blocking condenser 170 to an amplifying and inverting valve 171. This valve is shown as a tetrode, and has associated with it the usual elements as follows:

| | |
|---|---|
| Grid leak resistance | 172 |
| Anode load resistance | 173 |
| Cathode bias circuit | 174 |
| Screen polarising resistance | 175 |
| Screen by-pass condenser | 176 |

The anode of the valve 171 is connected to the output terminal 85.

Figure 8:
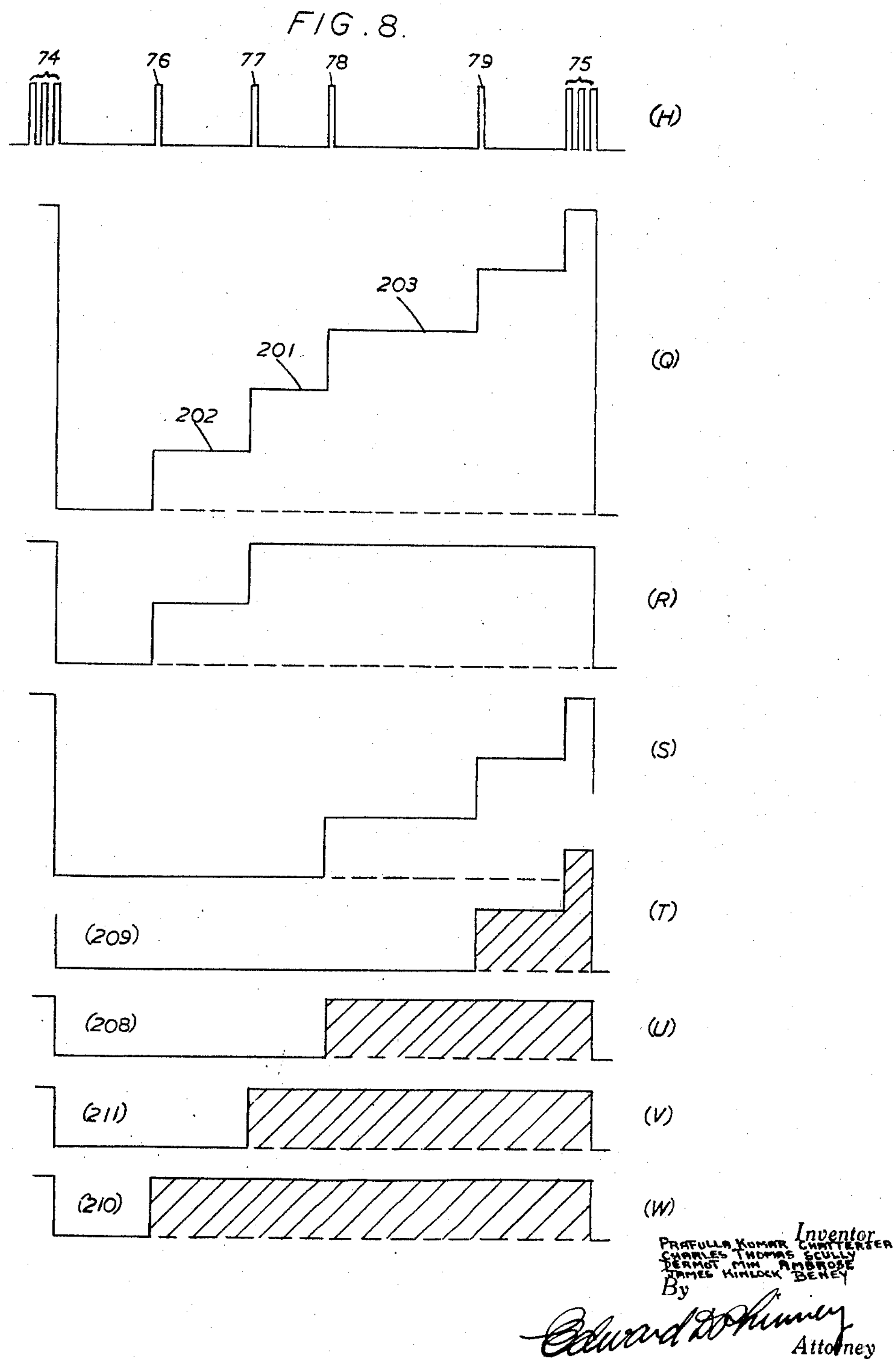

Referring now to Fig. 5, the wave shown in Fig. 7 (P) after being inverted, is applied at the input terminals 87 and 88. This inverted wave is shown in Fig. 8 at (Q), the original pulses being shown at (H). The terminal 87 is connected in parallel to two oppositely directed diodes 177 and 178 and thence to earth through corresponding equal load resistances 179 and 180 and the common by-pass condenser 181. The two diodes are biassed positively by means of a potentiometer 182 connected across the high tension supply, the terminals of which are 183 and 184.

The cathode of diode 177 and the anode of diode 178 are respectively connected to similarly arranged pairs of diodes 185, 186 and 187, 188, having equal load resistances 189, 190, 191 and 192, with by-pass condensers 193 and 194, and bias potentiometers 195 and 196 connected across the high tension supply. Interposed between the load resistances 189 and 190, and between the load resistances 191 and 192 are additional bias resistances 197 and 198 respectively, shunted by condensers 199 and 200.

Referring to Fig. 8 (Q), the bias of the two diodes 177 and 178 should be adjusted by means of the potentiometer 182 to be approximately equal to the potential of the middle step 201. Then the diode 177 will be blocked and diode 178 will conduct until the potential applied at terminal 87 exceeds this value. Thus only the first two steps of the wave (Q), Fig. 8, as shown at (R), pass through the diode 178 and the remaining steps as shown at (S) pass through the diode 177.

The bias of the diode 187 should be adjusted by means of the potentiometer 196 to be slightly higher than the potential corresponding to the step 202 of the wave (Q) (Fig. 8). Then only upper step of the wave (R) will be passed by this diode. The resistance 198, through which the current of diode 188 passes, reduces the bias of this diode to a potential slightly below the step 202. Thus only the lower step of wave (R) passes through the diode 187.

In a similar way the potentiometer 195 should be adjusted so that the bias of the diode 185 is slightly higher than the potential corresponding to the step 203 of the wave (Q), and the resistance 197 biasses the diode 186 at a somewhat lower potential. Thus only the upper two steps of the wave (S) pass through the diode 185 and only the lower step passes through the diode 186.

The four diodes 185, 186, 187 and 188 are respectively connected through blocking condensers 204, 205, 206 and 207 to four identical channel demodulators 208, 209, 210 and 211 the detailed circuit of 211 only being shown accordingly, to each of these demodulators these will be applied from the corresponding diode a time duration modulated rectangular pulse with a fixed trailing edge, and a moving leading edge coinciding with the corresponding channel pulse. These pulses are shown in Fig. 8 (T) to (W) the number of the corresponding channel demodulator being shown in brackets in each case.

The channel demodulator 211 comprises a low pass filter 212 of any suitable type adapted to suppress frequencies of 10 kcs. and higher, but having a cut-off frequency above the highest frequency of importance in the modulating signals. The filter is terminated by a load resistance 213 having a tapping point connected to the control grid of a low frequency amplifying valve 214 arranged in a conventional manner. The amplified signal output is taken through a transformer 215 having its primary winding connected in series with a resistance 216 between the anode of the valve and terminal 183, and its secondary winding connected to the signal output terminal 217. The anode by-pass condenser is 218 and the usual cathode bias circuit is 219. The screen grid is polarised through the resistance 220, the corresponding by-pass condenser being 221.

The gas-filled valve 222 is provided for receiving the special calling signal which, as already explained, is produced by suppressing the channel pulses at the transmitting end. It was explained in connection with Fig. 7 (P) that when a channel pulse is suppressed the corresponding vertical edge of the step moves to a fixed position somewhat later than the position corresponding to the channel pulses. This means that the corresponding rectangular pulses applied to the channel demodulator are shortened. These pulses are applied through a condenser 223 to the control grid of the valve 222 which grid is connected to earth through a resistance 224 shunted by a condenser 225. The anode is connected through a relay 226 to a source of alternating current (at 50 cycles per second, for example) connected to terminal 227. Adjustable bias for the cathode of the valve 222 is provided by the potentiometer 228 connected across the high tension supply. The cathode by-pass condenser is 229.

The time constant of the elements 224, 225 should be sufficiently large to damp out the fluctuations of the pulses resulting from the signal modulation. The condenser 223 should be relatively small, so that the time constant of the combination of elements 223, 224, 225 will be of the same order as the synchronised period. The bias of the valve 222 should be adjusted so that the positive peaks of the pulses applied to the control grid are unable to fire the valve. It has already been explained that when the pulse 77 is suppressed, the corresponding rectangular pulse shown at (V) (Fig. 8), is shortened. It can be shown that the effect of this is to increase the amplitude of the positive peaks applied to the control grid, so that the valve is fired, operating the relay 226.

The operation of the relay 226 may be made to operate contacts (not shown) adapted to give a suitable signal. It is to be noted that the anode is polarised with alternating current in order to ensure the extinction of the valve when the control grid potential falls on the re-appearance of the pulse 77.

The remaining channel demodulators 208, 209 and 210 may be identical with the demodulator just described in detail, and the demodulated signals are obtained from the corresponding output terminals 230, 231 and 232.

Although the receiver described with reference to Figs. 4 and 5 was arranged for four channels, it may be adapted for any number of channels by simple modifications which will be explained briefly. First, the frequency of the saw-tooth waves generated by the valve 119 should be adjusted to be a little greater than $n$ times the frequency generated by the valve 120 where $n$ is the number of channels concerned. The choice of this frequency is determined by the condition that one period of the lower frequency waves should exceed $n$ periods of the higher frequency waves by a time slightly greater than the total duration of the synchronising signal. Thus, in the particular example chosen for illustration, the two frequencies were 10 kcs. and 43 kcs. The difference between one period of the former and 4 periods of the latter is about 9 microseconds while the length of the synchronising signal is 5½ microseconds. This ensures that the last fly-back stroke 159, Fig. 7 (K) occurs just before the first of the group of three (or more) synchronising pulses 75, so that the discharge of the condenser 146 at the end of the period is ensured.

The action of the circuit will be the same as already described, and the number of steps in the stepped waves is equal to the number of channel pulses. In Fig. 5, the number of diodes will be modified appropriately. It can be seen that a further pair of diodes may be connected to each of the diodes 185 to 188, arranged in the same way, providing for 8 channels, and the array may be extended in the same way to accommodate a number of channels equal to an integral power of 2. Moreover, for any other number of channels, diodes in this type of array may be omitted. Thus, for example, referring to Fig. 5, if there are only two channels all the diodes 185 to 188 may be omitted, and the diodes 177 and 178 may be connected directly to two of the channel demodulators, for example 209 and 210. For three channels, diodes 187 and 188, and demodulators 211 can be omitted, and the diode 178 can be connected directly to 210. For five channels, an additional pair of diodes (not shown) may be connected to 185, for example, connected respectively to 208, and to an extra demodulator (not shown). For six channels an extra pair of diodes may be connected to each of the diodes 185 and 186, and so on. The bias of the diodes will be arranged so that each final diode limits at a level which cuts the vertical edge of the corresponding step in the stepped wave of the type shown in Fig. 8 (Q).

Figure 9:
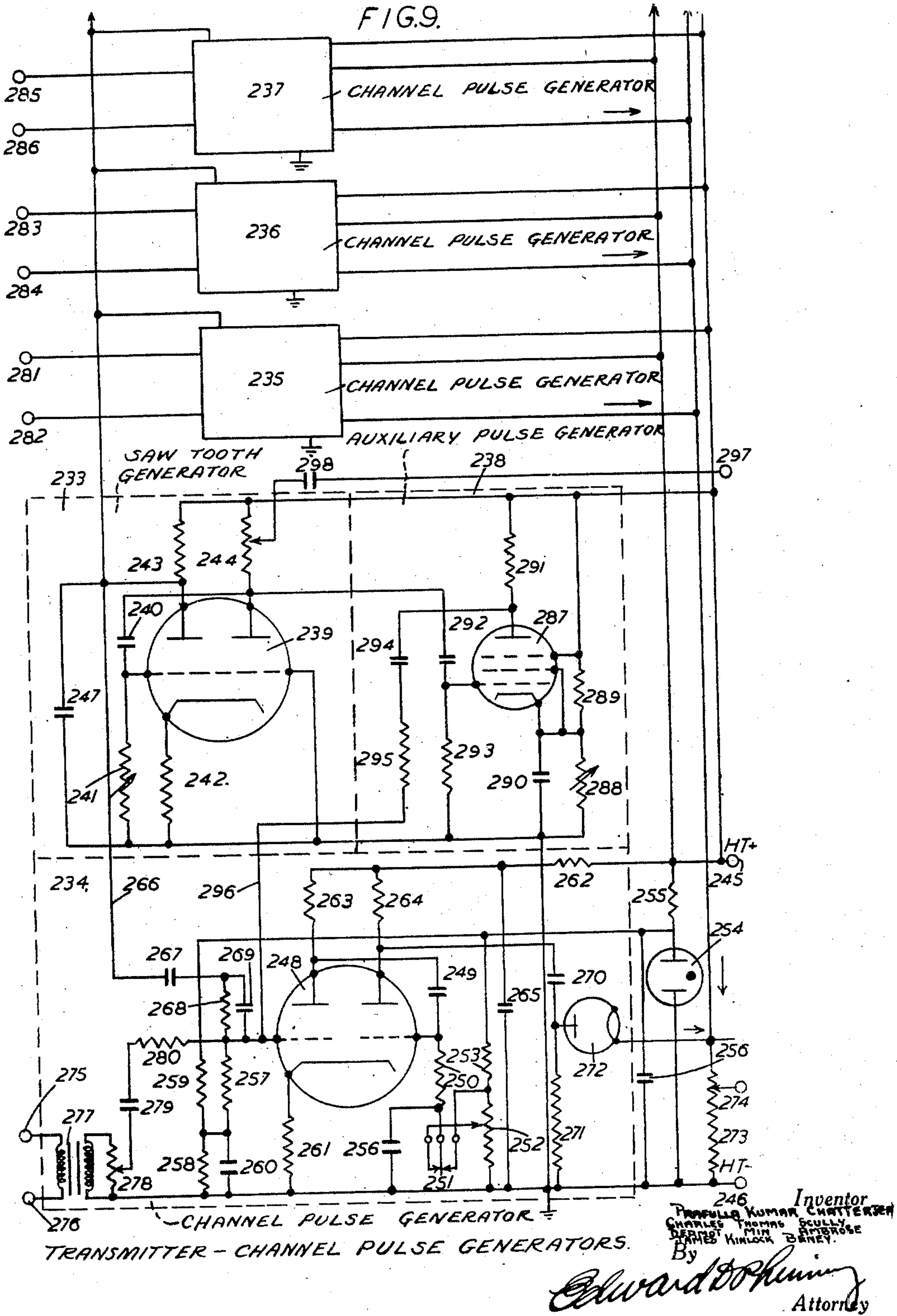

An alternative form of the transmitting apparatus for the system of the invention is shown in Figs. 9 and 10. This apparatus is adapted to produce the same channel pulses and synchronising signals as the apparatus of Figs. 1 and 2, and differs therefrom principally in that the gas-filled valves used in generating the pulses are replaced by hard valves, but there are other differences which will become apparent from the description which follows:

Fig. 9 shows the saw-tooth generator 233 and the channel pulse generators of which four are shown, designated 234, 235, 236 and 237. There may, however, be any number of these channel pulse generators. Circuit details of 234 only are given, as the others may be identical with it, except for an adjustment which will be explained later. Fig. 9 shows also an auxiliary pulse amplifier 238 which will generally only be required in connection with the pulse generator 234 which is allotted to the generation of the pulses 76 (Fig. 3 (B)), corresponding to the first of the channels. The reason for this will presently be made clear.

Fig. 10 includes the arrangements for generating the synchronising signals 74 and 75 (Fig. 3 (B)), means for mixing the channel pulses with the synchronising signals, and circuits for amplifying and cleaning up the generated pulses.

Referring to Fig. 9, the saw-tooth wave generator 233 comprises a double triode vacuum valve 239 which is arranged to operate analogously to a gas-filled valve as regards the firing and extinguishing properties. This type of circuit is particularly suitable for use in the system of the present invention when it is desired to avoid the use of gas-filled valves.

The left-hand control grid is connected to the right-hand anode through a large blocking condenser 240, and to earth through an adjustable leak resistance 241. The other control grid is directly earthed and the common cathode is connected to earth through a resistance 242. The anodes are connected respectively through resistances 243 and 244 to the positive terminal 245 of the high tension supply, the earthed negative terminal of which is 246. The left hand anode is connected to earth through a condenser 247.

The saw-tooth waves are generated by the charging of the condenser 247 through the resistance 243, and by its sudden discharging through the left hand portion of the valve. The action is as follows. Suppose that at first the resistance 243 be disconnected from the terminal 245, the condenser 247 being discharged. The left-hand anode is at zero potential and the common cathode is at a positive potential due to the anode current of the right hand portion of the valve. Suppose now that the connection between the resistance 243 and the terminal 245 be restored. The left-hand anode commences at zero potential due to the presence of the condenser 247 which begins to charge up. Owing to the fact that the cathode is at a positive potential, there can be no anode current in the left-hand half of the valve, which half is therefore cut off. The potential of this anode rises and presently reaches a point at which anode current first begins to be appreciable. When this happens an increase in the cathode potential occurs, which is equivalent to a reduction in the control grid voltage of the right-hand half of this valve, and this produces an amplified increase in the anode voltage of this half of the valve. This increase is communicated to the left-hand control grid through the condenser 240 which further increases the anode current of the left-hand half. This change is fed round continuously so that the anode current of the left-hand half increases suddenly to a maximum and discharges the condenser 247. The left-hand anode voltage at the same time falls suddenly and cuts off the corresponding half of the valve. The disappearance of the left-hand anode current in the cathode resistance 242 restores the right portion to its original condition. The condenser 247 starts to charge up again and the process is repeated. It will be noted that the voltage of the right-hand anode does not vary except while the condenser 247 is being discharged, which is the period of the fly-back stroke of the generated saw-tooth wave, and during this period the right-hand anode generates a short rectangular positive pulse of voltage having a duration equal to the fly-back period. This short rectangular pulse is utilised to control the generation of the multiple synchronising signal, as will be explained later.

The frequency of the generated saw-tooth waves is determined chiefly by the capacity of the condenser 247 and the value of the resistance 243, which for the particular case previously considered should be adjusted to obtain a frequency of 10 kcs. The adjustable grid leak resistance 241 forms a fine adjustment for the frequency since together with the resistance 244 it operates effectively in shunt with the charging circuit through the blocking condenser 240.

A similar double vacuum triode 248 is used in the channel pulse generator 234, and carries out practically the same function as the gas-filled valve 23 in the generator 2 of Fig. 1. The left-hand anode is connected to the right-hand control grid through a blocking condenser 249. This grid is connected through a leak resistance 250 and a set of change-over contacts 251 to the movable contact of a biasing potentiometer 252 which is connected in series with a resistance 253 across the terminals of a source of potential stabilised by the neon tube 254 connected in series with a resistance 255 between the high tension terminals 245 and 246. The by-pass condenser 256 is shunted across the grid bias source. The other control grid is connected through a resistance 257 to the junction of two resistances 258 and 259 connected across the neon tube 254 in order to provide suitable bias for this grid, the resistance 258 being shunted by the by-pass condenser 260. The common cathode is earthed through the resistance 261. The two anodes are connected to the positive high tension terminal 245 through a common resistance 262 and respective resistances 263 and 264, the by-pass condenser being 265.

The saw-tooth waves from the generator 233 are applied over the conductor 266 through a blocking condenser 267 and resistance 268 to the left-hand control grid of the valve 248. The resistances 268 and 257 form a reducing potentiometer whereby a suitable fraction (for example $^1/_{20}$) of the saw-tooth voltage is applied to the left-hand control grid. The resistance 268 is shunted by a condenser 269 which compensates for the distortion introduced by the stray capacity which effectively shunts the resistance 257.

The valve 248 operates in the manner described in the specification of U. S. Patent No. 2,441,954 of P. K. Chatterjea et al. issued May 25, 1948, for "Hard Valve Pulse Generator." The left-hand half of the valve is initially cut off, and when the rising saw-tooth voltage has reached a certain point, anode current begins to appear in the left-hand half of the valve and the change in fed round and amplified through the other half of the valve, and the left-hand half then rapidly proceeds to saturation. On the occurrence of the fly-back stroke, the left-hand half is cut off again and the right-hand anode generates a rectangular positive pulse. The point at which the left-hand half becomes conducting depends on the adjustment of the bias of the right-hand grid, so that the duration of the generated pulse may be adjusted by the setting of potentiometer 252. This generated pulse is differentiated by the condenser 270 and resistance 271, and the short positive differentiated pulse, which coincides with the leading edge of the rectangular pulse, (which is the movable edge when the pulses are modulated) is selected by the diode 272 and passed to the common load resistances 273. A variable tap on this resistance is connected to an output terminal 274.

The modulating signals are applied at the input terminals 275 and 276 to a transformer 277 terminated by a load resistance potentiometer 278. The adjustable tap on this potentiometer is connected through a condenser 279 and resistance 280 to the left-hand control grid of the valve 248. Modulation of the leading edge of the rectangular pulse generated at the right-hand anode, and thus of the positive differentiated pulse is thereby obtained.

Input terminals for the remaining channel pulse generators are designated 281, 282, 283, 284; and 285, 286, respectively.

The pulse outputs of all these generators are connected in multiple to the common load resistance 273 as indicated.

When the bias of the right-hand control grid of the valve 248 is adjusted so that the left-hand side conducts very soon after the occurrence of the fly-back stroke, it may be found that the next fly-back stroke is of insufficient amplitude to cut off the valve. This is likely to occur for the first of the channel pulses, such as 76 in Fig. 7 (B). To overcome this, and to ensure the cutting off of the valve, the auxiliary pulse amplifier 238 is provided. This amplifier comprises a pentode valve 287 arranged as a conventional amplifier. The cathode is biassed from a potentiometer comprising an adjustable resistance 288 and a fixed resistance 289 connected across the terminals of the high tension supply, the cathode by-pass condenser being 290. The anode load resistance is 291. The short rectangular pulse generated at the right hand anode of the valve 239 is applied through a differentiating condenser 292 and resistance 293 to the control grid of the valve 287. This valve is biassed below the cut off, and the short positive differentiated pulse renders it conducting and produces an amplified short negative pulse at the anode. This short negative pulse is applied through the blocking condenser 294 and resistance 295 and over the conductor 296 to the left-hand control grid of the valve 248. This pulse coincides with the beginning of the fly-back stroke and carries the potential of the left-hand control grid sufficiently negative to ensure the cutting off of the corresponding section of the valve.

While in a four channel system, such as the one taken for illustration of the invention, only the generator corresponding to the first channel is likely to need the special cutting off pulse, in a system having a large number of channels, this pulse may be necessary for several of the earlier channel generators. It will be evident that the amplifier 238 may serve in common for all such generators, the anode of the valve 287 being connected separately to each of them in the manner shown for the generator 234.

The set of contacts 251 is provided for suppressing the channel pulses when it is desired to call over the channel. These contacts may be changed over by hand or by an appropriate relay or the like. The effect is to apply a large positive bias to the right-hand control grid of the valve 248, and this prevents the left-hand portion of the valve from being unblocked by the saw-tooth wave, so that no pulse is emitted.

The rectangular pulse generated at the right-hand anode of the valve 239 is employed to control the generation of the triple pulse synchronising signal. This rectangular pulse is taken at terminal 297 from the movable contact on the potentiometer 244 through a blocking condenser 298. The arrangements for generating the synchronising signal are shown in Fig. 10, the terminals 299, 300 and 301 of which are intended to be connected directly to terminals 246, 274 and 297, respectively of Fig. 9.

The synchronising signal is generated by a pentode valve 302 having associated therewith an oscillation circuit. The anode is coupled directly to the control grid through a transformer 303, the primary winding of which is tuned by the adjustable condenser 304. Resistances 305 and 306 are respectively connected in series with the anode and control grid, and the cathode is positively biassed by means of the usual condenser-resistance network 307 so that the valve does not oscillate. The positive pulse generated by the valve 239 (Fig. 9) appears across the resistance 308 (Fig. 10) and applies a positive potential to the control grid of the valve 302. This unblocks the valve, which oscillates for the duration of the pulse.

The transformer 303 should be tuned so that the frequency of the oscillations generated is equal to the repetition frequency required for the pulses which make up the synchronising signal, which, for the example previously chosen, should be 500 kcs. The duration of the unblocking pulse should be chosen so that the valve executes just three complete oscillations (or other larger number equal to the number of pulses which are required to make up the synchronising signal). The duration of the unblocking pulse can be adjusted to the desired value by suitable choice of the components of the circuit associated with the valve 239 (Fig. 9). Where three pulses at 2 microsecond intervals are required, the duration of the unblocking pulse should be about 5½ microseconds.

The oscillations obtained at the anode of the valve 302 (Fig. 10) are passed through a limiting diode 309 having a load resistance 310, and through a blocking condenser 311, to the anode of the valve 312, where they are mixed with the channel pulses, as will be presently explained. The diode 309 is biassed by means of the potentiometer 313 (which is connected across the terminals 314 and 315 of the high tension supply), the by-pass condenser being 316. The bias should be adjusted so that only the tips of the negative loops of the oscillations appear across the diode load 310, the widths of the loops at the level of cutting being about ½ microsecond.

The valve 312 is arranged as an amplifier for the channel pulses which appear at terminal 300, which is connected to the control grid of the valve. The anode load resistance is 317, the resistance 318 shunted by the by-pass condenser 319 being used to obtain an appropriate anode voltage. The cathode is biassed from the adjustable potentiometer 320 connected across the high tension supply, 321 being the by-pass condenser. The channel pulses applied to the control grid are of positive polarity, and negative amplified pulses are obtained from the anode, where they are mixed with the synchronising signals obtained from the valve 302. The mixed pulses, which are all of negative polarity, are applied to the suppressor grid of the valve 322 through a blocking condenser 323 and conductor 324. This valve is employed to clean up the pulses so that they all have the same rectangular form.

Suitable anode potential for the valve 322 is obtained from the potentiometer consisting of the resistances 325 and 326 connected across the high tension supply, with a by-pass condenser 327 provided. The anode load resistance is 328 and the control grid is biassed positively from the potentiometer 329 with by-pass condenser 330, through the leak resistance 331. The screen grid is polarised through the resistance 332, the corresponding by-pass condenser being 333.

The negative pulses which appear across the resistance 334 connected to the screen grid of the valve 322 are arranged to cut off the anode current so that positive pulses of constant amplitude are obtained at the anode. Adjustment of the control grid bias by means of the potentiometer 329 enables the duration of the rectangular pulses so obtained to be accurately adjusted to the desired value (½ microsecond, for example).

It now only remains to amplify the pulses which have been cleaned up so that they contain the necessary energy. This is done by means of the last valve 335 which is a power tetrode, but in order to obtain positive output pulses, an inverting valve 336 is interposed, to the control grid of which the pulses from the anode of valve 322 are applied through the blocking condenser 337, the grid leak resistance being 338. The cathode of the valve 336 is biassed by means of the condenser-resistance network 339, and 340 is the anode load resistance.

The anode of the valve 336 is connected to the control grid of the valve 335 through the blocking condenser 341. This control grid is adjustably biassed through the leak resistance 342 from the potentiometer 343 with the usual by-pass condenser connected to an appropriate source 344 of negative voltage indicated conventionally as a battery. The cathode of the valve 335 is biassed positively by means of the network 345 and 346 in the anode load. The screen grid is polarised through the resistance 347, the corresponding by-pass condenser being 348. The amplified pulses, which then appear as shown in Fig. 3 (B) are obtained from the output terminals 349 and 350, the latter being connected to the anode of the valve 335 through a blocking condenser 351. The amplitude of the output pulses may be adjusted by means of the potentiometer 343.

Referring again to Fig. 9, while the valves 239 and 248 have been shown as double triodes, either could be replaced by two triodes in separate envelopes, with the cathodes connected together.

It will be understood that as in the case of Fig. 1, the only difference between the channel pulse generators 234, 235, 236, 237 etc. is in the setting of the potentiometer 252, by which the individual channel pulses may be placed at the desired point in the synchronised period, obtaining for example the spacing shown in Fig. 3 (B).

Figure 11:
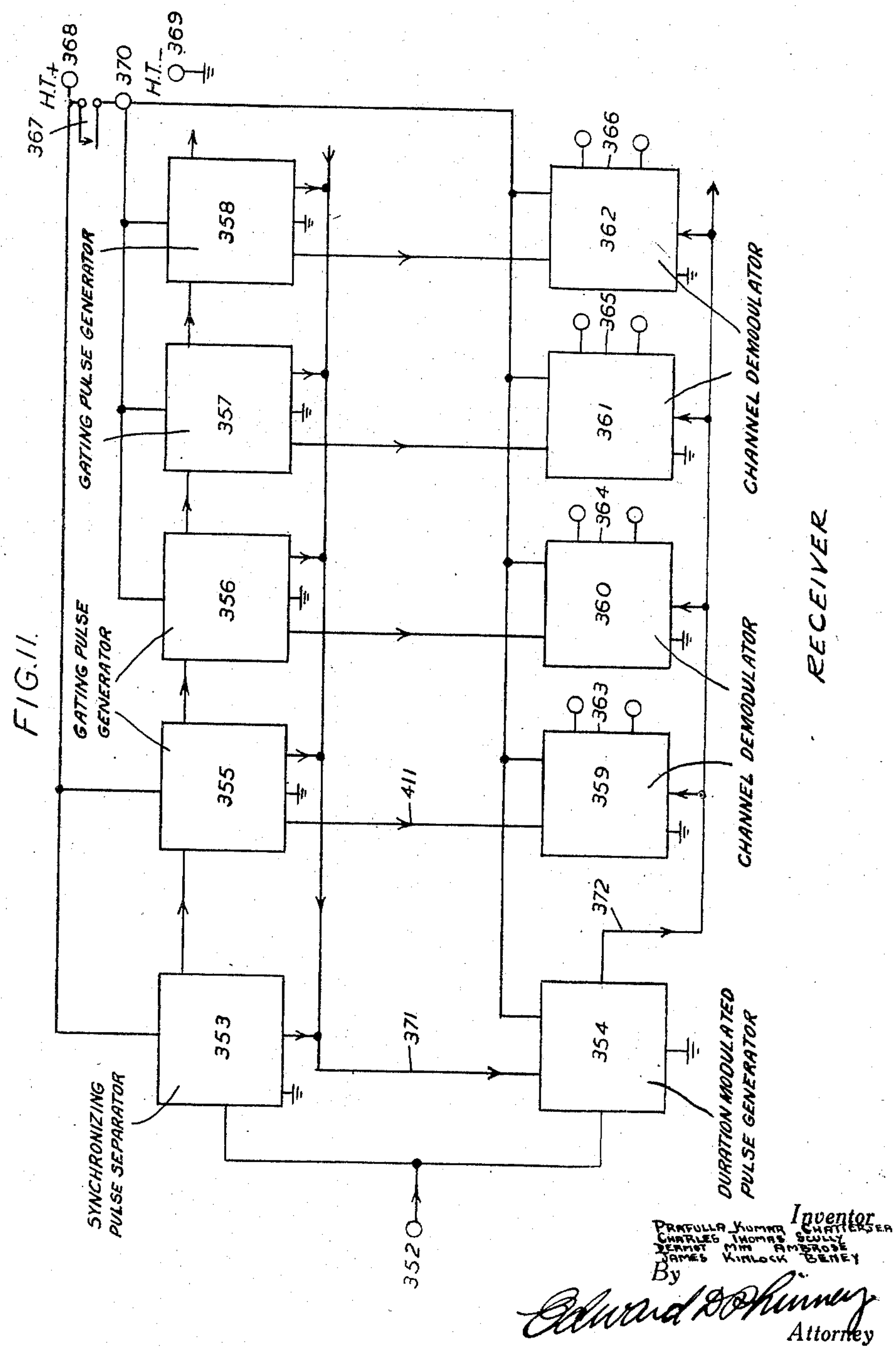
Fig. 11 shows a block schematic circuit diagram of an alternative receiving arrangement.

An alternative type of receiver for the type of signal shown in Fig. 3 (B), not employing any gas-filled valves, is shown in Fig. 11. This receiver also differs from that illustrated in Figs. 4 and 5 in the method of separating the channels. In order that the operation of this alternative receiver may be clearly understood, Fig. 11 has been drawn in block schematic form, details of the various blocks being given in Figs. 13 to 16.

Referring to Fig. 11, the incoming signal pulses are applied to the input terminal 352 which is connected to a synchronising pulse separator 353 and to a circuit 354 for deriving time-duration modulated pulses from the time-phase modulated channel pulses.

The synchronising pulse separator 353 is connected to and synchronises the first of a series of four gating pulse generators 355, 356, 357, 358 connected in tandem, each of which synchronises the following one. The number of these pulse generators should be equal to the number of channels, and is not restricted to four.

Each of the gating pulse generators controls a corresponding channel demodulator, of which four are shown designated 359, 360, 361 and 362. The duration modulated pulses corresponding to all channels, which are generated by the device 354, are applied to all the channel demodulators in parallel. These demodulators are all normally blocked, but each is unblocked just at the right time to accept each of the corresponding channel duration modulated pulses by a gating pulse supplied from the corresponding gating pulse generator. The demodulated signals corresponding to the various channels are then separately obtained at the output terminals 363, 364, 365 and 366.

The gating pulse generator 355 differs from all the others in the provision of a relay (not shown in Fig. 11) which controls a pair of contacts 367. The positive terminal, and the negative (grounded) terminal of the high tension supply are respectively designated 368 and 369, and it will be noted that only the devices 353 and 355 are supplied directly from the terminal 368. As soon as any synchronising signals are received by the device 353, and are supplied therefrom to the gating pulse generator 355, the previously mentioned relay is operated; closing the contacts 367. The high tension voltage is then supplied through these contacts to terminal 370, and thence to the rest of the apparatus. The purpose of this arrangement is to render the receiver quiet when no signals are coming in. It also reduces the consumption of current during the idle periods.

Figure 12:
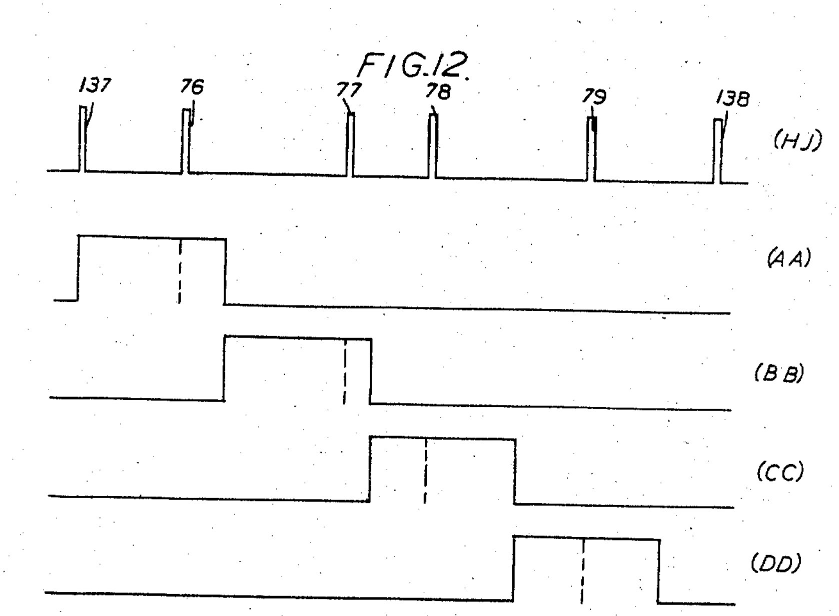
Fig. 12 shows diagrams used in explaining the action of this alternative receiving arrangement.

As will be explained fully later on, the synchronising pulse separator 353 operates in substantially the same way as the corresponding device in Fig. 4, and produces a single synchronising pulse slightly later than the corresponding synchronising signal, as illustrated in Fig. 7 (H) and (J). This synchronising pulse causes the gating generator 355 to emit a rectangular gating pulse, the leading edge of which coincides with the synchronising pulse, and the trailing edge of which is adjustable in time. A short pulse coinciding with the trailing edge is applied to initiate a similar gating pulse in the next generator 356, having an adjustable trailing edge, and so on. In Fig. 12 (HJ) the channel pulses 76 and 79 shown in Fig. 7 (H) have been placed in the proper time relation with the synchronising pulses 137 and 138 shown in Fig. 7 (J). The series of gating pulses produced by the generators 355 and 358 are shown at (AA) to (DD) in Fig. 12. It will be noted that the leading edge of the first one coincides with the pulse 137 and the leading edge of each of the others coincides with the trailing edge of the previous one.

Short pulses coinciding with the trailing edges of the gating pulses are mixed with the synchronising pulse 137 and are applied negatively over the conductor 371 to the circuit 354. The channel pulses are also applied positively to this circuit from the terminal 352, and as will be explained later, a reservoir condenser in the circuit 354 is charged by each of the channel pulses in turn and discharged again by the short negative pulse which follows after. In this way a series of duration-modulated pulses is produced, the leading edges of which coincide with the moving channel pulses, and the trailing edges of which coincide with the trailing edges of the gating pulses. The leading edges of these duration modulated pulses are shown dotted in Fig. 12 (AA) to (DD).

These duration modulated pulses are simultaneously applied to the four channel demodulators 359 to 362 over the conductor 372. Each of the demodulators is unblocked by the corresponding gating pulse for a period long enough to enable it to accept the corresponding duration modulated channel pulse when it comes in, all the other demodulators being blocked for this period. In this way the duration modulated channel pulses are sorted out and separately demodulated, the corresponding signals being respectively obtained from the output terminals 363 to 366.

The durations of the gating pulses should preferably be made equal by appropriate adjustments in the generators 355 to 358, and their total duration should be made slightly less than the synchronised period separating the pulses 137 and 138, shown in Fig. 12 (HJ). This provides for the maximum modulation of the channel pulses.

Figure 13:
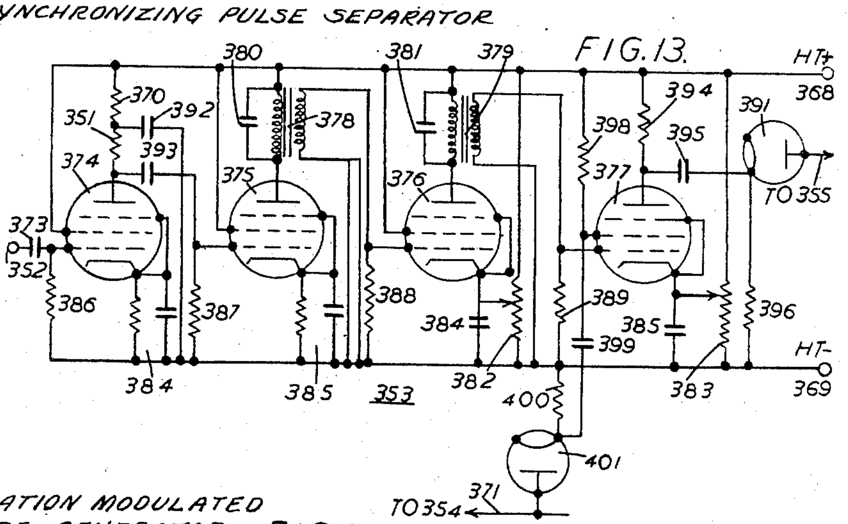
Figs. 13 to 16 show circuit details of the apparatus employed in Fig. 11.

Fig. 13 shows the details of the synchronising pulse separator 353. It is generally similar to the corresponding separator described with reference to Fig. 4, there being certain minor differences.

The incoming pulses, which are of the kind shown in Fig. 7 (H), are applied to the terminal 352 and thence through a blocking condenser 373 to the control grid of an amplifying valve 374 which is provided principally for inverting the pulses. The pulses from the anode of this valve, which are now of negative polarity, are applied to the control grid of the first of a series of three valves 375, 376, and 377 which are arranged similarly to the valves 98, 99 and 100 of Fig. 4. The valves 375 and 376 have transformers 378 and 379 respectively connected in series with the anodes, the primary windings of which are shunted by tuning condensers 380 and 381. The transformers should be tuned to the repetition frequency of the three pulses forming the synchronising signal (500 kcs. in the case of the example already used for illustration). Each secondary winding is connected between ground and the control grid of the following valve.

The cathodes of the valves 376 and 377 are adjustably biased by the potentiometers 382 and 383 with by-pass condensers 384 and 385. The action of the three valves 375, 376 and 377 is substantially the same as that of valves 98, 99 and 100 and described in connection with Fig. 4, and will therefore not again be described in detail. The potentiometers 352 and 353 should be adjusted so that the oscillations shown in Fig. 6 (G) and (E) respectively unblock the following valves at the levels indicated by the dotted lines indicated in Fig. 6 (G) and (E).

The various circuit elements associated with the valves 374, 375, 376 and 377 are conventional and will be briefly listed as follows:

| | |
|---|---|
| Cathode bias networks for valves 374 and 375 | 384 and 385 |
| Grid leak resistances for the four valves | 386, 387, 388 and 389 |
| Anode resistances for the valve 374 | 390 and 391 |
| Anode by-pass condenser | 392 |
| Blocking condenser | 393 |
| Anode resistance for the valve 377 | 394 |

The single negative output pulse produced at the anode of the valve 377 is differentiated by the condenser 395 and resistance 396, and the negative differentiated pulse is selected by the diode 397 and is applied to synchronise the first of the gating pulse generators 355 as already explained in connection with Fig. 11.

It will be noted that the screen grid of the valve 377 is polarised through a load resistance 398, so that a single negative pulse will also be obtained from this screen grid. This pulse is differentiated by the condenser 399 and resistance 400, and the negative differentiated pulse is selected by the diode 401 and applied over the conductor 371 to the circuit 354 together with pulses from the gating pulses from the gating pulse generators 356 to 358 as already explained.

It will be understood that as in the case of Fig. 4, when the synchronising signal consists of more than three closely spaced pulses, one or more additional valves (not shown) arranged in the same way as the valve 376 may be interposed between the valves 376 and 377.

Figure 14:
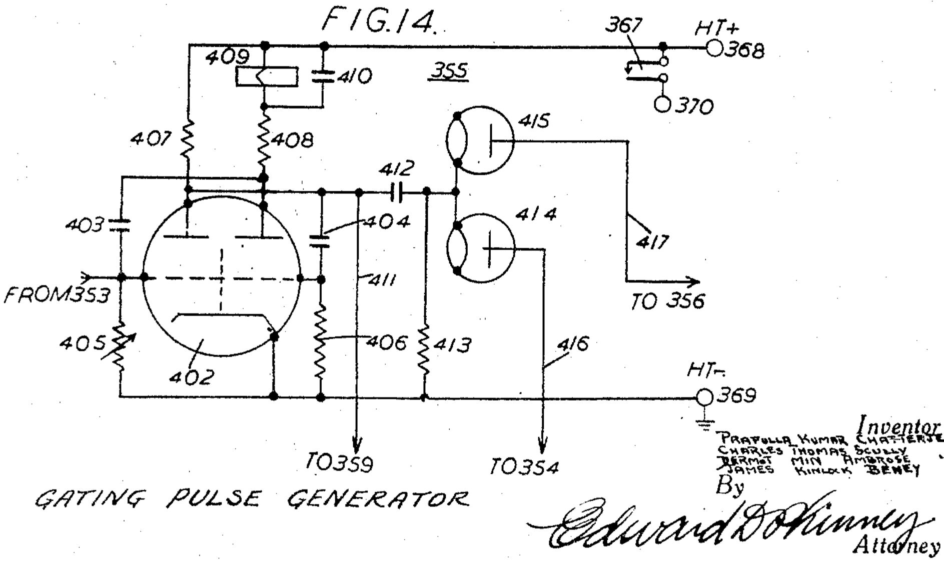

Details of the gating pulse generator 355 are shown in Fig. 14. A double triode valve with the common cathode grounded is arranged as a simple multivibrator of well known type, the anodes being cross connected to the opposite control grids by respective condensers 403 and 404. The corresponding grid resistances are 405 and 406, of which the former is adjustable. The two anodes are respectively supplied with anode current through resistances 407 and 408, and a relay 409 shunted by a large by-pass condenser 410 is connected in series with the resistance 408.

The time constant of the elements 403, 405 and 408 should be of the order of the duration required for the gating pulses, while that of the elements 404, 406 and 407 should be very much larger, for example, about 1,000 times. Negative synchronising pulses from the separator 353 are applied to the left-hand control grid as indicated, and will block the left-hand half of the valve, at the same time charging the condenser 403. The charge leaks away at a rate determined by the time constant of the elements 403, 405 and 408 until the left-hand half unblocks and returns to its original condition, which remains practically unchanged until the arrival of the next synchronising pulse, owing to the high time constant of the other part of the circuit. The left-hand anode thus emits a positive pulse whose duration may be adjusted by means of the resistance 405.

The gating pulses so obtained are applied to the corresponding channel demodulator 359 over the conductor 411.

The positive gating pulses obtained from the left-hand anode are also differentiated by the condenser 412 and resistance 413. Two separate diodes 414 and 415 are provided to select negative differentiated pulses (which coincide with the adjustable trailing edge of the gating pulse) and to supply them separately over conductors 416 and 417 respectively to the circuit 354 and to the next following gating pulse generator 356, as explained in connection with Fig. 11.

The relay 409 is provided to control the contacts 367 for switching on the high tension voltage to the terminal 370 which supplies the larger portion of the apparatus. As soon as any synchonising signals arrive, the change in the mean anode current of the right-hand half of the valve 402 causes the relay 409 to close the contacts 367.

The gating generators 356, 357, 358 etc. are all the same as 355 except that the relay 409 and condenser 410 are not required and are omitted, the resistances 407 and 408 being connected directly to the terminal 370 instead of to 368. Also in 358 (or the last gating pulse generator of the series) the diode 415 is not required, since there is no following gating pulse generator to be synchronized.

Figure 15:
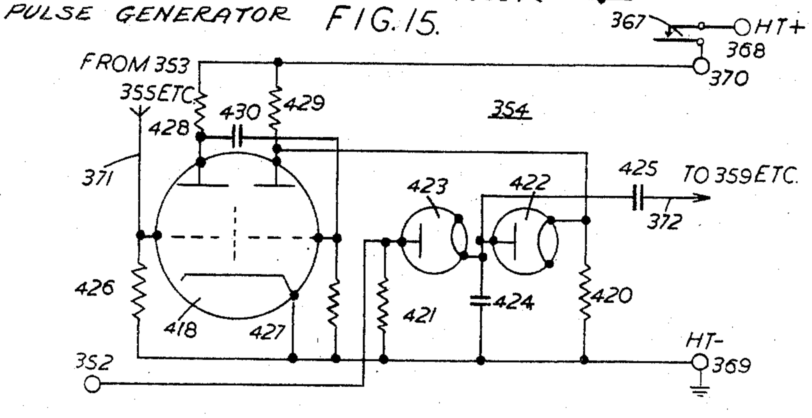

Fig. 15 shows details of the circuit 354 for deriving the time-duration modulated pulses from the time-phase modulated channel pulses. A double triode valve 418 is arranged as a simple two stage amplifier. The short negative pulses from the devices 353, 355, 356, 357, 358 etc. are applied to the control grid of the first section over the conductor 371. As already explained these short pulses coincide with the synchronising pulse 137 shown in Fig. 12 (HJ) and with the trailing edges of the gating pulses shown at (AA) to (DD). Amplified negative pulses are obtained from the anode of the second section of the valve 418 and are applied through a blocking condenser 419 to a load resistance 420. Likewise, positive pulses from the input terminal 352 are applied to another load resistance 421. The resistances 420 and 421 are connected through diodes 422 and 423 to the previously mentioned reservoir condenser 424. These diodes are so directed that each of the pulses arriving from terminal 352 charges the condenser 424 positively, and so that the following negative pulse arriving over condenser 419 discharges it again. The potential variations of the condenser 424 are transmitted through the blocking condenser 425 to the conductor 372, and thence to all the channel demodulators 359, 360, 361, 362 etc. as described with reference to Fig. 11. In this way a number of rectangular pulses is produced from the condenser 424, the leading edges of which move with the modulated channel pulses 76, 77, 78, 79 etc. and the trailing edges of which coincide with the trailing edges of the corresponding gating pulses. The leading edges of these rectangular pulses are indicated by the dotted lines in Fig. 12 (AA) to (DD).

The conventional circuit elements associated with the double triode valve 428 are as follows:

| | |
|---|---|
| Grid leak resistances | 426 and 427 |
| Anode load resistances | 428 and 429 |
| Coupling condenser | 430 |

It will be noted that the anodes are connected to the terminal 370, as already explained, so that anode current is only supply after the contacts 367 have been closed by the operation of relay 409 (Fig. 14).

Figure 16:
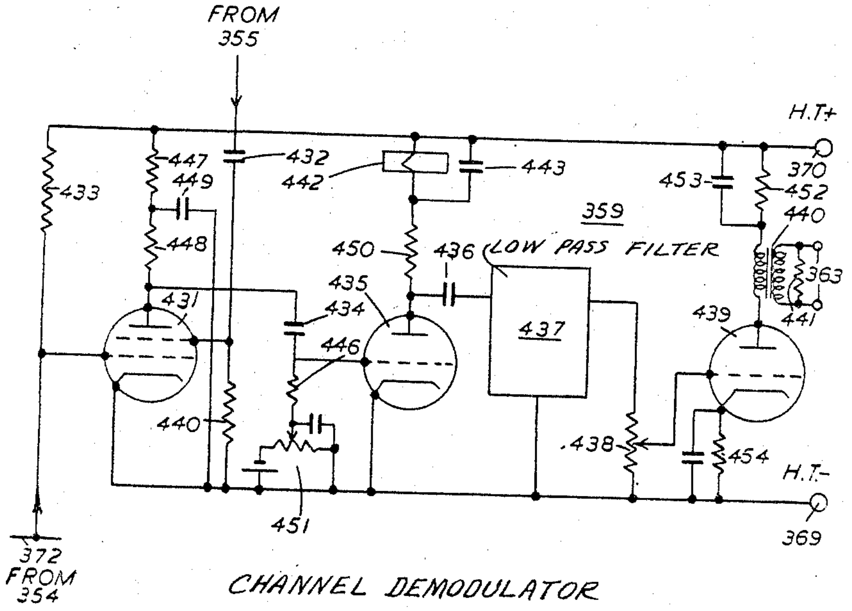

Fig. 16 shows the details of the channel demodulator 359. All the others may be the same. It comprises a gating tetrode valve 431 to the control grid of which are applied the positive duration modulated pulses from the device 354, the positive gating pulses from the generator 355 being applied to the screen grid through a blocking condenser 432. The screen grid is earthed through the resistance 440, so that the valve is cut off in the absence of any pulses applied to the screen grid. The cathode is directly earthed, and the control grid is connected to the positive high tension terminal 370 through a high resistance 433. The valve is thus blocked to all the duration modulated channel pulses which are applied to the control grid, except that one which occurs when the corresponding gating pulse is applied to the screen grid for unblocking the valve.

The duration modulated channel pulses after passing the gating valve are applied over the blocking condenser 434 to the control grid of an amplifier valve 435 and thence through a blocking condenser 436 and a low pass filter 437 of any suitable type adapted to cut off above the highest modulating signal frequency. The filter is terminated by a resistance 438 across which are obtained the modulating signal voltages. A tap on the resistance 438 is connected to the control grid of a low frequency amplifying valve 439, the signal output being obtained from a transformer 440 having its primary winding connected in series with the anode of the valve 439 and its secondary winding connected to the output terminals 363. A terminating resistance 441 is shunted across the secondary winding, and may be chosen so that a desired output impedance, for example 600 ohms, is obtained.

A relay 442 shunted by a by-pass condenser 443 is connected in series with the anode of the valve 435. This relay is adapted to respond to the change of anode current in the valve 435 which occurs when the channel pulses are suppressed for the purpose of calling over the channel. The suppression of these pulses causes the disappearance of the corresponding duration modulated rectangular pulses and so the valve 435 has no input during the suppression period. The relay 442 controls appropriate contacts (not shown) for giving a suitable visual or audible signal.

The usual circuit elements are associated with the valves 431, 435, and 439. These are briefly listed as follows:

| | |
|---|---|
| Grid leak for the valve 435 | 446 |
| Anode resistances for valve 431 | 447 and 448 |
| By-pass condenser | 449 |
| Anode resistance for valve 435 | 450 |
| Adjustable negative grid bias arrangement for valve 435 | 451 |
| Anode resistance and by-pass condenser for valve 439 | 452 and 453 |
| Cathode bias network for valve 439 | 454 |

It will be evident that many of the minor details of the circuits which have been described may be varied in a number of ways. For example double triodes may be replaced by two separate triodes. Similarly to save space the various diodes may be paired up and replaced by double diodes; or any diode may be replaced by some other suitable type of unidirectional device such as a dry rectifier. The biasing and polarising of the valve electrodes may be arranged in a number of different well known ways.

What is claimed is:

1. An electric communication system comprising means for generating a train of regularly repeated channel pulses, means for modulating the said train in accordance with the intelligence to be conveyed, means for generating a train of regularly repeated synchronising signals each signal comprising a group of at least three separated, but closely spaced pulses identical in form and amplitude with the said channel pulses, means for transmitting all the said pulses over a communication medium to a receiver, and means at the receiver controlled by the synchronizing signals for demodulating the train of channel pulses for the purpose of recovering the intelligence.

2. A multi-channel electric communication system comprising means for generating a train of regularly repeated synchronising signals defining successive equal synchronised periods; means for generating a plurality of trains of channel pulses of identical form and amplitude, corresponding channel pulses in each train occurring at different times in each synchronised period, the said synchronising signals consisting of a group of more than two separated, but closely spaced pulses identical in form and amplitude with the channel pulses; means for time-phase modulating each of the said trains of channel pulses in accordance with a signal wave; means for transmitting all the pulses over a communication medium to a receiver; and means at the receiver controlled by the said synchronising signals for separately demodulating the said trains of channel pulses.

3. An electric communication system of the kind in which a train of channel pulses is time-phase modulated in accordance with the intelligence to be conveyed to a receiver, comprising means for transmitting synchronising signals with the channel pulses to the receiver, each signal consisting of a group of three or more closely spaced pulses identical in form and amplitude with the channel pulses, means for suppressing the channel pulses for the purpose of conveying a calling signal, and means at the receiver controlled by the synchronising signals and responsive to the suppression of the channel pulses for the purpose of giving the calling signal.

4. An electric communication system comprising means for generating a train of regularly repeated channel pulses, means for modulating said train in accordance with the intelligence to the conveyed, means for generating a train of regular repeated synchronising pulses including means for generating periodic waves, means for applying said periodic waves to a resonant circuit to excite therein a damped train of oscillations of higher frequency than said periodic waves, amplitude limiting means for selecting only those loops of the oscillations exceeding a given amplitude and to convert said selected loops into a group of closely spaced pulses, and damping means for said oscillations adjusted to limit said pulses to a group of given number, means for transmitting all the said pulses over a communication medium to a receiver, and means at the receiver controlled by the synchronising signals for demodulating the train of channel pulses for the purpose of recovering the intelligence.

5. A system according to claim 4 wherein said receiving means comprises means for deriving from each synchronising signal a single synchronising pulse in fixed relation therewith, means controlled by the said single synchronizing pulses for deriving from each train of channel pulses a corresponding train of time duration modulated pulses, and means for separately demodulating each train of time duration modulated signals.

PRAFULLA KUMAR CHATTERJEA.
CHARLES THOMAS SCULLY.
DERMOT MIN AMBROSE.
JAMES KINLOCH BENEY.

REFERENCES CITED

The following references are of record in the file of this patent:

UNITED STATES PATENTS

| Number | Name | Date |
|---|---|---|
| 2,172,746 | Young | Sept. 12, 1939 |
| 2,262,838 | Deloraine et al. | Nov. 18, 1941 |
| 2,263,369 | Skillman | Nov. 18, 1941 |
| 2,277,000 | Bingley | Mar. 17, 1942 |
| 2,282,046 | Goldsmith | May 5, 1942 |
| 2,395,467 | Deloraine | Feb. 26, 1946 |
| 2,403,210 | Butement | July 2, 1946 |